US011947447B2

(12) United States Patent
Yin et al.

(10) Patent No.: US 11,947,447 B2
(45) Date of Patent: Apr. 2, 2024

(54) SYSTEMS AND METHODS FOR EVALUATING PRODUCT TESTING

(71) Applicant: Rainforest QA, Inc., San Francisco, CA (US)

(72) Inventors: Chris Yin, Redwood City, CA (US); Russell Howard Smith, San Francisco, CA (US); Frederick Henry Stevens-Smith, San Francisco, CA (US); Derek Choy, Dublin, CA (US); Elliot Beaudoin, El Sobrante, CA (US)

(73) Assignee: Rainforest QA, Inc., San Francisco, CA (US)

( * ) Notice: Subject to any disclaimer, the term of this patent is extended or adjusted under 35 U.S.C. 154(b) by 0 days.

(21) Appl. No.: 16/403,427

(22) Filed: May 3, 2019

(65) Prior Publication Data

US 2020/0349056 A1 Nov. 5, 2020

(51) Int. Cl.
*G06F 11/36* (2006.01)
*G06F 16/957* (2019.01)
(Continued)

(52) U.S. Cl.
CPC ...... *G06F 11/3664* (2013.01); *G06F 11/3612* (2013.01); *G06F 16/9577* (2019.01); *H04L 67/535* (2022.05); *H04L 67/54* (2022.05)

(58) Field of Classification Search
CPC ......... G06F 11/36–3696; G06F 11/664; G06F 16/9577; H04L 67/22; H04L 67/24; H04L 67/54; H04L 67/535
See application file for complete search history.

(56) References Cited

U.S. PATENT DOCUMENTS 9,111,030 B1 * 8/2015 Dunn ............... G06F 16/248
9,558,098 B1   1/2017 Alshayeb et al.
(Continued)

FOREIGN PATENT DOCUMENTS

WO  WO 2014210542 A2   12/2014
WO  WO-2016200413 A1 * 12/2016 ......... G06F 11/3668
WO  WO 2018119149 A1   6/2018

OTHER PUBLICATIONS

Geng, Ruili, and Jeff Tian. "Improving web navigation usability by comparing actual and anticipated usage." IEEE transactions on human-machine systems 45.1 (2014): 84-94. (Year: 2014).*
(Continued)

*Primary Examiner* — Kevin L Young
*Assistant Examiner* — Joanne G Macasiano
(74) *Attorney, Agent, or Firm* — Vista IP Law Group, LLP

(57) ABSTRACT

An electronic system includes a first data retriever to communicate with a first database associated with an analytic tool, and a second data retriever to communicate with a second database associated with an electronic testing device; wherein the analytic tool is configured to store information regarding actual usage of a product in the first database; wherein the electronic testing device is configured to store product testing data for the product in the second database; wherein the first data retriever comprises a first communication interface to electronically receive the information; wherein the second data retriever comprises a second communication interface to electronically receive the product testing data; and wherein the electronic system further comprises a processing unit configured to compute a score indicating a quality of product testing for the product based on the information regarding the actual usage of the product and/or the product testing data.

35 Claims, 22 Drawing Sheets

(51) Int. Cl.
*H04L 67/50* (2022.01)
*H04L 67/54* (2022.01)

(56) References Cited

U.S. PATENT DOCUMENTS

| | | | |
|---|---|---|---|
| 9,646,269 B1* | 5/2017 | Ben-Cnaan | G06Q 10/06 |
| 9,727,448 B1* | 8/2017 | Seibert, Jr. | G06F 11/3676 |
| 10,380,010 B2* | 8/2019 | Brown | G06F 11/327 |
| 10,423,709 B1* | 9/2019 | Bradley | G06F 40/216 |
| 10,503,631 B1* | 12/2019 | Talluri | G06F 11/3636 |
| 10,606,736 B1* | 3/2020 | Gardner | G06F 11/3006 |
| 10,754,762 B2* | 8/2020 | Karanamsetty | G06F 11/3664 |
| 2001/0044705 A1 | 11/2001 | Vardi et al. | |
| 2006/0123389 A1 | 6/2006 | Kolawa et al. | |
| 2007/0011304 A1 | 1/2007 | Error | |
| 2014/0351793 A1 | 11/2014 | Bartley et al. | |
| 2015/0067527 A1 | 3/2015 | Gardner et al. | |
| 2015/0254165 A1* | 9/2015 | Baril | G06F 11/3676 714/38.1 |
| 2016/0162392 A1 | 6/2016 | Hu et al. | |
| 2017/0091460 A1* | 3/2017 | Kuhr | G06F 21/71 |
| 2017/0109767 A1 | 4/2017 | Shpanya et al. | |
| 2017/0139723 A1* | 5/2017 | Holland | G06Q 10/0639 |
| 2019/0155958 A1* | 5/2019 | Lal | G06F 16/953 |
| 2019/0377736 A1* | 12/2019 | Balasubramanian | G06F 40/284 |
| 2020/0183812 A1* | 6/2020 | Eberlein | G06F 11/3664 |

OTHER PUBLICATIONS

Kallepalli, Chaitanya, and Jeff Tian. "Measuring and modeling usage and reliability for statistical web testing." IEEE transactions on software engineering 27.11 (2001): 1023-1036. (Year: 2001).*

Brooks, Penelope A., and Atif M. Memon. "Automated GUI testing guided by usage profiles." Proceedings of the 22nd IEEE/ACM International Conference on Automated Software Engineering. 2007. (Year: 2007).*

Karami, Gity, and Jeff Tian. "Improving web application reliability and testing using accurate usage models." Software Engineering Research, Management and Applications (2018): 75-92. (Year: 2018).*

International Search Report and Written Opinion dated Jul. 27, 2020 for corresponding PCT Application No. PCT/US2020/031236.

* cited by examiner

FIG. 3

| | Product testing tasks | Questions | Answers | Tracker identifier |
|---|---|---|---|---|
| 1 | Click on tab "New test" | Do you see new test page? | Y | Image file 342 |
| 2 | Select the second tab | Do you see a new image at lower right? | Y | Image file 482 |
| 3 | Type in "XYZ" in the parameter field, and click submit | Do you see a table of values in a pop up screen? | N | Image file 429 |

| ID: 23 | X | Y | Time | Select |
|---|---|---|---|---|
| 1 | 23 | 36 | 0.0 | |
| 2 | 37 | 38 | 0.5 | |
| 3 | 39 | 40 | 1.0 | |
| 4 | 41 | 44 | 1.5 | |
| 5 | 46 | 45 | 2.0 | |
| 6 | 44 | 48 | 2.5 | Y |
| 7 | 36 | 55 | 3.0 | |
| 8 | 30 | 53 | 3.5 | |

FIG. 7

∅ ○ New test   Exploratory Run   ≡Tests  ⊙Results  ⊾Reports  | Search titles, steps, and tags Q |  ⊠  ⊡ Russell Smith ▽

4431 / Account Settings - Change Password  | Read only
Test URL: https://app.rainforestqa.com/settings/account
| Steps | History  Feedback (10) |

Last updated by: Russell Smith - 12/06/2017 —— 902

Tester starts on https://app.mfrstqa.com/

Login (ReadOnly version) [embedded test]
1. If you do see a login screen, log in with the email "t.((logins.client_ra))https://rainforestqa.com" and the password "((logins.password))".
   Are you logged in ?
   then goes to http://app.rainforestqa.com/settings/account —— 904

2. Scroll down until you see tw password fields.
   Do you see one input field that says "CURRENT PASSWORD," and one that filled "NEW PASSWORD"?  ☑ REDIRECT TESTER 3. Type "boomboom" into the input field underneath current password and "bambam" into the new password field.
   Now press the Update Account button at the bottom of the page
   Do you get an error message ?

4. New type "{{logins.password}}" into the current password field and "bambam" into the new password field then click the Update Account button again
   Does the Update Account Button turn green?

5. New type "bambam" into the current password field and "{{logins.password}}" into the new password field then click the Update Account button again

906

Run test

Preview Test ⊙  ▽ —— 907

VARIABLES
Add a Variable

PLATFORMS
VMS   Mobile Devices
[grid of platform icons] —— 908

NOTES:
①

SYSTEMS AND METHODS FOR EVALUATING PRODUCT TESTING

FIELD

This application relates generally to testing products, and more specifically, to product testing systems.

BACKGROUND

Many products require product testing. Supplier of products may require products be tested before they can be made available to customers. Sometimes, after a product has been made available, it may still be desirable to test the product. Testing of products can be a lengthy and complicated process. There may be many different technical features in the product that need to be tested under different testing parameters. Also, after product testing is performed, the supplier may not know how good is the product testing. For example, a product testing may cover certain aspects of a product, but may neglect other aspects of the product.

SUMMARY

An electronic system includes a first data retriever configured to communicate with a first database associated with an analytic tool, and a second data retriever configured to communicate with a second database associated with an electronic testing device; wherein the analytic tool is configured to generate and store information regarding actual usage of a product in the first database; wherein the electronic testing device is configured to generate and store product testing data for the product in the second database; wherein the first data retriever comprises a first communication interface configured to electronically receive the information regarding the actual usage of the product from the first database; wherein the second data retriever comprises a second communication interface configured to electronically receive the product testing data from the second database; and wherein the electronic system further comprises a processing unit configured to compute a score indicating a quality of product testing for the product based on the information regarding the actual usage of the product and/or the product testing data.

Optionally, the analytic tool comprises a web analytic tool.

Optionally, the analytic tool comprises Google Analytics, Segment, MixPanel, or Heap.

Optionally, the product comprises a website, and wherein the information from the data source indicates traffic distribution for different parts of the website.

Optionally, the processing unit comprises a normalizer configured to normalize the information regarding actual usage of the product.

Optionally, the processing unit is configured to compute the score based on a plurality of weights.

Optionally, the weights correspond respectively with different parts of the product.

Optionally, the processing unit comprises a metric generator configured to generate metrics for respective aspects of the product.

Optionally, the processing unit also comprises a combiner configured to combine the metrics to determine the score.

Optionally, the combiner is configured to apply respective weights for the metrics before combining the metrics to determine the score.

Optionally, one of the aspects of the product comprises a webpage of a website.

Optionally, one of the metrics indicates a degree of testing coverage for a respective one of the aspects of the product.

Optionally, the metric generator is configured to generate one of the metrics based on a difference or a ratio between a number of user visits at a webpage and a number of tests performed for the webpage.

Optionally, the metric generator is configured to generate one of the metrics based on a difference or a ratio between a normalized number of user visits at a webpage and a normalized number of tests performed for the webpage.

Optionally, the processing unit is configured to determine an additional score, wherein the score and the additional score are for respective different times, and wherein the electronic system further comprises a database structure configured to store the score and the additional score in association with the respective times.

Optionally, the score and the additional score indicates how the quality of the product testing changes over time for the product.

Optionally, the processing unit is also configured to generate a recommendation for a new product testing based on the score.

Optionally, the processing unit is also configured to automatically provision one or more new product tests to test the product based on the score.

Optionally, the electronic testing device is configured to provide a user interface for allowing multiple testers to perform product testing for the product to generate the product testing data.

Optionally, the product testing data indicates aspects of the product that have been tested.

Optionally, the product testing data indicates numbers of product testing performed for respective aspects of the product.

Optionally, the electronic system further includes a non-transitory medium having a database structure that is configured to store the score in association with the product testing data Optionally, the database structure is also configured to store the score in association with the information regarding the actual usage of the product.

Optionally, the score indicates a degree of coverage achieved by the product testing.

Optionally, the score indicates how well a distribution of the product testing of various features of the product corresponds with a distribution of the actual usage of the product.

Optionally, the processing unit comprises one or more normalizers configured to normalize the information regarding the actual usage of the product, and/or to normalize the product testing data.

Optionally, the score is based at least in part on the normalized information regarding the actual usage of the product, and/or the normalized product testing data.

Optionally, the electronic system further includes a graphic generator configured to generate a graphic indicating the score.

Optionally, the product comprises a web page, a web site, a computer application, a mobile device application, or a processor application.

Optionally, the processing unit is configured to provide the score for display on a hand-held device.

Optionally, the processing unit is configured to provide the score for display on a computer screen or a laptop screen.

Other and further aspects and features will be evident from reading the following detailed description of the embodiments.

BRIEF DESCRIPTION OF THE DRAWINGS

The drawings illustrate the design and utility of embodiments, in which similar elements are referred to by common reference numerals. These drawings are not necessarily drawn to scale. In order to better appreciate how the above-recited and other advantages and objects are obtained, a more particular description of the embodiments will be rendered, which are illustrated in the accompanying drawings. These drawings depict only typical embodiments and are not therefore to be considered limiting of its scope.

FIG. 3 illustrates an example of a user interface for providing a notification to a product tester.

FIG. 5 illustrates an example of a data structure for linking assigned product testing tasks with product testing questions, answers, and tracker identifiers.

FIG. 7 illustrates an example of a data structure for creating a graphic associated with an image of a web page being tested.

FIG. 9 illustrates an example of a user interface for allowing a user to create tasks for product testing and to define product testing parameters.

FIG. 10A-10E illustrate an example of a report that is provided to an administrator of the system of FIG. 1A.

DESCRIPTION OF THE EMBODIMENTS

Figure 1A:
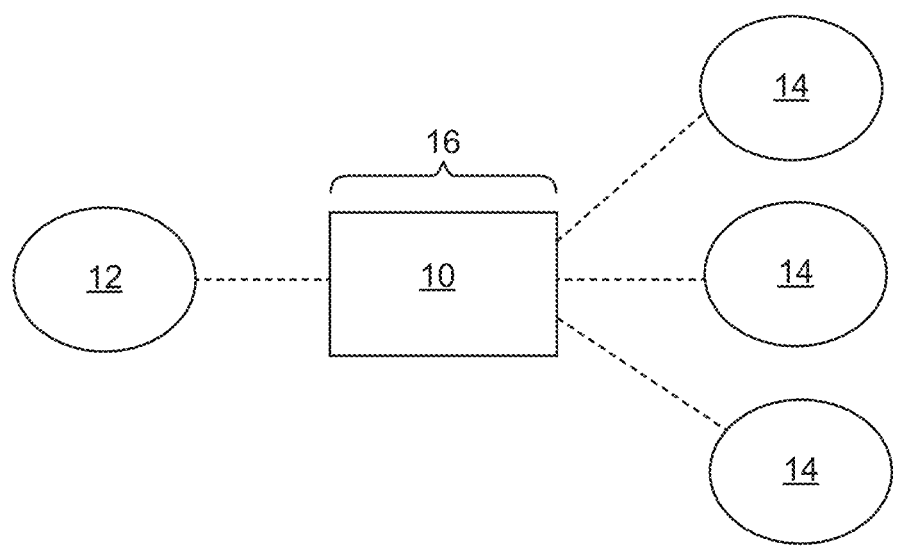
FIG. 1A illustrates a system for providing product testing.

Various embodiments are described hereinafter with reference to the figures. It should be noted that the figures are not drawn to scale and that elements of similar structures or functions are represented by like reference numerals throughout the figures. It should also be noted that the figures are only intended to facilitate the description of the embodiments. They are not intended as an exhaustive description of the invention or as a limitation on the scope of the invention. In addition, an illustrated embodiment needs not have all the aspects or advantages shown. An aspect or an advantage described in conjunction with a particular embodiment is not necessarily limited to that embodiment and can be practiced in any other embodiments even if not so illustrated.

FIG. 1A illustrates a system 10 for providing product testing. The system 10 is configured to connect a party 12 that has developed a product with one or more product testers 14. By means of non-limiting examples, the product may be a web page, a web site, a computer application (e.g., an enterprise application), a mobile (e.g., handheld) device application, an application for a specialized processor (e.g., an image processor, a signal processor, a sound processor, a speech processor, a processor in a vehicle (such as a car, a plane, etc.), or any of other types of processor). The product testers 14 may be individuals residing in different parts of the world. For example, the testers 14 may reside in different parts of a city, different cities, different states, and/or different countries. In the illustrated embodiments, the system 10 is associated with a party 16 that is different from the party 12. For example, the party 12 (first party) providing the product may be a first company, and the party 16 (second party) interfacing with the party 12 and the product testers 14 may be a second company that is not the same as the first company. Also, in some embodiments, the product testers 14 are not employees of the first party 12, and are not employees of the second party 16. For example, the product testers 14 may be individual contractors. In other embodiments, one or more of the product testers 14 may be employees of the party 16.

Figure 1B:
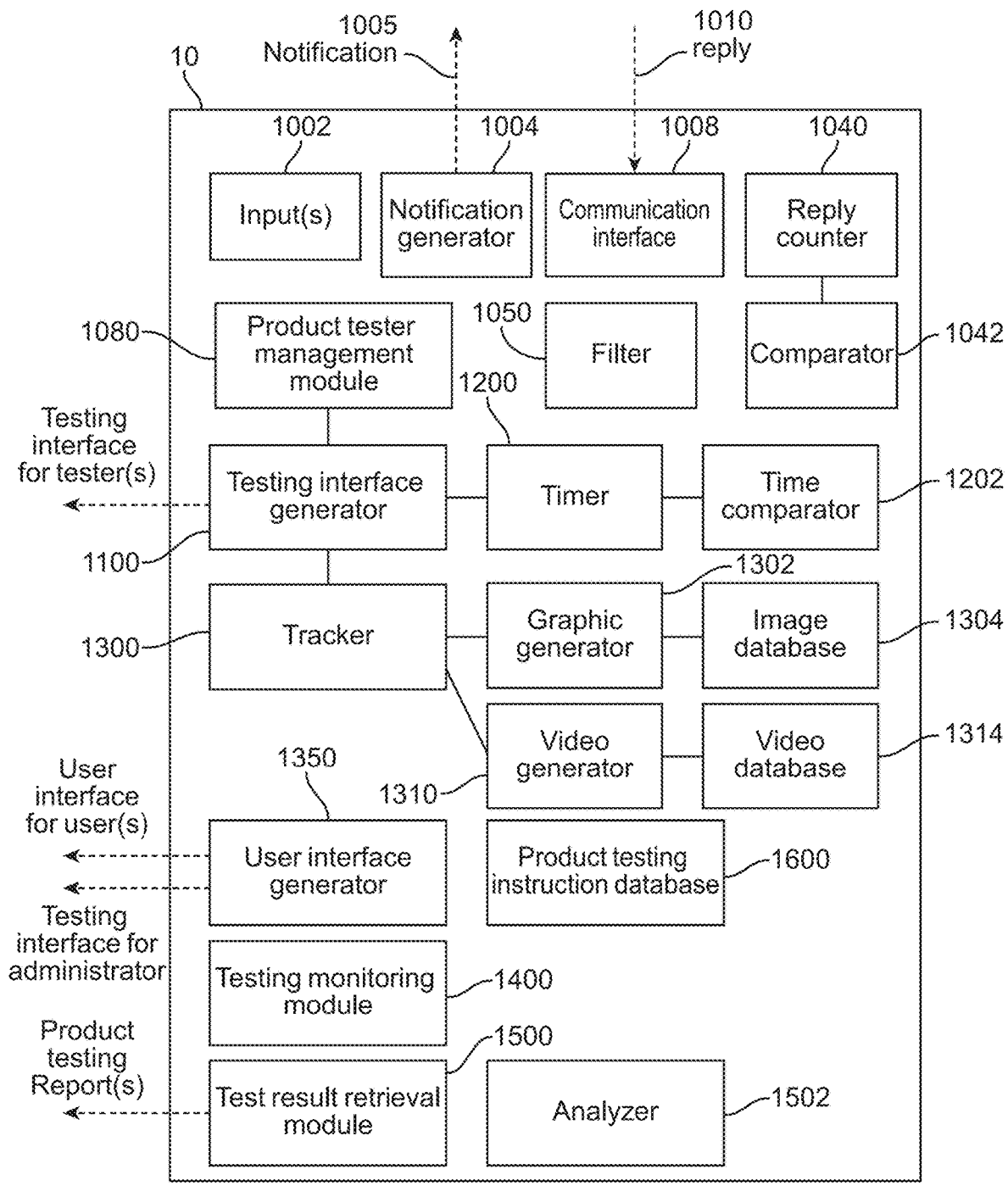
FIG. 1B illustrates an example of the system of FIG. 1A.

FIG. 1B illustrates an example of the system 10 of FIG. 1A. The system 10 includes one or more input(s) 1002, a notification generator 1004, a communication interface 1008, a reply counter 1040, a comparator 1042, a filter 1050, a product tester management module 1080, a testing interface generator 1100, a timer 1200, a time-comparator 1202, a tracker (tracking device) 1300, a graphic generator 1302, an image database 1304, a video generator 1310, a video database 1314, a user interface generator 1350, a testing monitoring module 1400, a test result retrieval module 1500, and an analyzer 1502. Details of these components will be described in further detail below. It should be noted that the system 10 is not limited to the example shown, and that the system 10 may have other configurations in other embodiments. For example, in other embodiments, the system 10 may not include one or more of the components shown in FIG. 1B. In further embodiments, the system 10 may be implemented using multiple devices, having different respect sets of one or more of the components shown in FIG. 1B.

In the illustrated embodiments, the product testers 14 have respective memberships and accounts with the party 16. For example, in order for a person to qualify as a product tester for the party 16, the person may need to go through a registration process with the system 10 to become a product tester 14. The product tester management module 1080 in the system 10 is configured to manage the various product testers 14. The product tester management module 1080 may be configured to provide a registration interface to receive information regarding a person who desires to be a product tester 14, so that the person is registered as a product tester 14 in the system 10. Each registered product tester 14 will have his/her login ID and password, which allow the product tester 14 to log into the system 10. The product tester management module 1080 may also be configured to provide training on product testing to train the person so that the person can be qualified as a product tester 14. In some embodiments, the product tester management module 1080 also manages the accounts of the various product testers 14. For example, after a product tester 14 completes a product testing project, the product tester management module 1080 may calculate a fee owed to the product tester 14 based on one or more features of the product testing project.

In some embodiments, the product tester management module 1080 also manages the accounts of the various product testers 14. For example, after a product tester 14 completes a product testing project, the product tester management module 1080 may calculate a fee owed to the product tester 14 based on one or more features of the product testing project. In one implementation, the fee owed to a product tester 14 may be calculated based on a number of tasks (steps) involved in the product testing. For example, if the product testing project involves 39 tasks, and the agreed rate between the product tester 14 and the second party 16 is $2 per task, then the fee for the product tester 14 for this project would be 39×2=$78. In some embodiments, all of the product testers 14 registered with the system 10 have the same pay rate. In other embodiments, different product testers 14 may have different scores indicating their level of experiences, reliabilities, etc. In such cases, the product testers 14 may have different respective pay rates based on these metrics.

During use of the system 10, when the first party 12 has developed a product, the first party 12 informs the second party 16 that its product needs to be tested. For example, the first party 12 may send a request to the system 10, and may transmit information regarding the product to be tested to the system 10. The request and/or the information regarding the product may be received by the input(s) 1002 of the system 10. For example, if the product is a web page, the first party 12 may provide a link for the web page, product testing parameters, and product testing tasks. In some embodiments, the user interface generator 1350 in the system 10 may provide an user interface for allowing the first party 12 to define product testing parameters and product testing tasks. These information may also be received via the input(s) 1002 of the system 10. For example, the first party 12 may access an user interface provided by the user interface generator 1350 of the system 10 to generate a list of tasks for a product tester 14 to perform, and to create a list of questions corresponding to the respective tasks for the product tester to answer. In one implementation, the user interface generator 1350 is configured to generate an image of the user interface for display on a device being used by the first party 12 when the first party 12 is on-line, and has logged into an account with the second party 16.

Figure 2A:
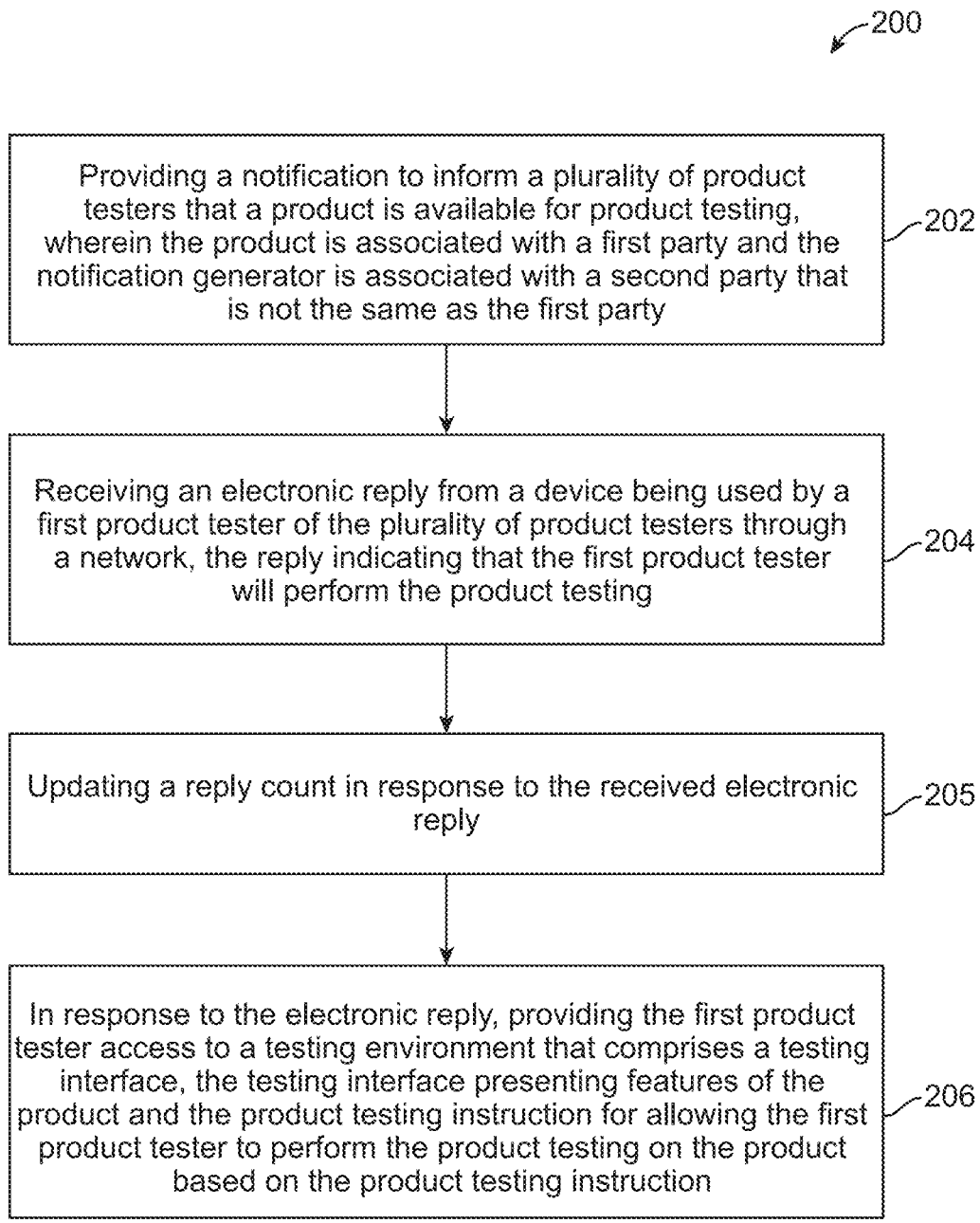
FIG. 2A illustrates a method for providing product testing.

FIG. 2A illustrates a processor-implemented method 200 performed by the system 10 of FIG. 1 for providing product testing. The method 200 may be described with reference to the system 10 of FIGS. 1A and 1B. In response to the request from the first party 12, the system 10 provides a notification 1005 to inform a plurality of product testers 14 that a product is available for product testing (item 202). In the illustrated embodiments, the product is associated with the first party 12 and the notification generator 1004 is associated with a second party 16 that is not the same as the first party 14.

In some embodiments, the notification 1005 provided by the system 10 is for display in a web browser. For example, the product tester 14 may open a web browser on his/her device. The web browser may include an add-on feature, which allows the product tester 14 to receive the notification 1005 from the system 10. In such cases, if the product tester 14 is on-line, the product tester 14 will receive the notification 1005. On the other hand, if the product tester 14 is off-line, then the product tester 14 will not receive the notification 1005. In the illustrated embodiments, the notification 1005 is "broadcasted" by the system 10 in the sense that multiple product testers 14 will receive the notification 1005 or will have access to such notification 1005.

In other embodiments, the notification 1005 may be for display in a field created by a product testing notification application. For example, the product tester 14 may install a product testing notification application onto his/her device, which allows the product tester 14 to receive the notification 1005 from the system 10. The product testing notification application may be provided by the second party 16 for installation or downloading onto a device of a product tester 14. The device being used by the product tester 14 may be a laptop, a desktop computer, or a handheld device (e.g., an iPhone, iPad, iPad mini, tablet, etc.).

In further embodiments, the notification 1005 may be sent to a job listing agent, or a crowd-testers provider, such as crowdflower or a mechanical turk, etc.

Accordingly, as used in this specification, the term "notification" may refer to any information for informing a product tester 14, wherein such information may be sent directly to a user interface on a device being used by the product tester 14, or to a job listing agent for allowing a product tester 14 to view. The notification may actively inform the product tester 14, or may passively inform the product tester 14 (in that the notification may be posted at a location at which the product tester 14 may search or discover such notification).

Figure 3:
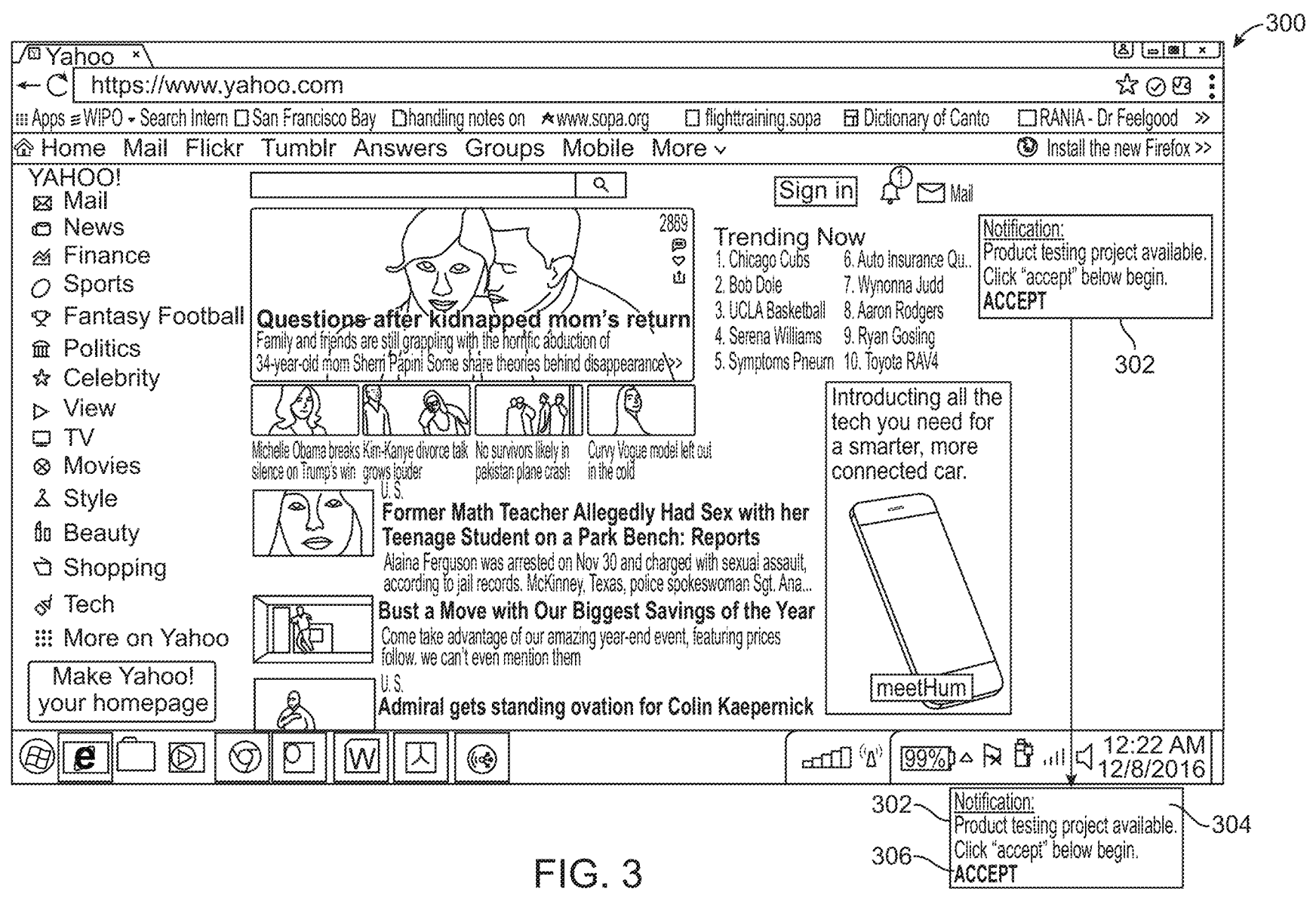

FIG. 3 illustrates an example of a user interface 300 for providing a notification to a product tester 14. The user interface 300 includes a field 302 for displaying a notification 304 provided by the system 10, indicating that a product testing project is available. The user interface 300 also includes a feature 306 for allowing a product tester 14 to accept the product testing project.

It should be noted that the user interface 300 for providing the notification to the product tester 14 is not limited to the example described previously, and that the user interface 300 may have other configurations in other embodiments.

Returning to the method 200 of FIG. 2, and the system 10 of FIGS. 1A and 1B, next, an electronic reply 1010 is received from a device being used by a product tester 14 of the plurality of product testers through a network (item 204). In the illustrated embodiments, item 204 may be performed by the communication interface 1008 at the system 10. The reply 1010 indicates that the product tester 14 will perform the product testing. The network transmitting the electronic reply may be any network, such as the Internet, a telecommunication network, etc. In some cases, the electronic reply 1010 may be generated using a web browser utilized by the product tester 14. For example, the web browser on a device utilized by the product tester 14 may include an add-on feature, which allows the product tester 14 to receive the notification 1005 (e.g., a ping, a message, a posting, etc.) from the system 10, like the example shown in FIG. 3. The same add-on feature may also allow the product tester 14 to provide his/her reply (for reception by the system 10) to accept or to sign up for a product testing project.

In other cases, the electronic reply 1010 may be generated using a product testing notification application utilized by the product tester 14. For example, the product tester 14 may install a product testing notification application onto his/her device, which allows the product tester 14 to receive the notification 1005 from the system 10. As discussed, the product testing notification application may be provided by the second party 16. The same product testing notification application may also allow the product tester 14 to provide his/her reply (for reception by the system 10) to accept or to sign up for a product testing project.

In further embodiments, as discussed, a product tester 14 may use crowdflower or a mechanical turk to obtain the notification 1005 regarding the product testing project. In such cases, the reply 1010 accepting the product testing project will be generated by a device using the crowdflower or mechanical turk.

As shown in the figure, the method 200 further includes updating a reply count in response to the received electronic reply (item 205). In the illustrated embodiments, item 205 is performed by the reply counter 1040 of the system 10.

In some embodiments, the method 200 may also include receiving additional electronic reply/replies 1010, keeping track with a number of replies 1010, and comparing the number of replies 1010 with a prescribed number. In some embodiments, the communication interface 1008 of the system 10 is configured to receive one or more additional electronic replies 1010 from one or more additional product testers 14 from the plurality of product testers 14 until a prescribed number of electronic replies 1010 has been reached. In response to each reply received by the communication interface 1008, the reply counter 1040 in the system 10 will increment the reply count by one. In such cases, after the communication interface 1008 received the first electronic reply 1010 from the product tester 14, the product testing project is then assigned only to the product tester 14, and not to any other product testers 14. The communication interface 1008 continues to receive additional reply until the total number of replies 1010 is equal to the prescribed number of electronic replies 1010, as determined by the comparator 1042 in the system 10. In the illustrated embodiment, the prescribed number of reply 1010 is one reply. In other embodiments, the prescribed number of replies 1010 may be more than one. For example, in some embodiments, the prescribed number of electronic replies 1010 may be three, four, five, six, or seven. In other embodiments, the prescribed number of electronic replies 1010 may two. In further embodiments, the prescribed number of electronic replies 1010 may be more than seven.

Referring to FIG. 2, next, in response to the electronic reply, the system 10 then provides a testing environment that comprises a testing interface for use by the product tester 14 (item 206). In some embodiments, the testing interface may be generated by the testing interface generator 1100 in the system 10. Also, in one implementation, item 206 may be performed by the system 10 providing the testing interface for display on a device being used by the product tester 14 after the product tester 14 has accepted the product testing project. For example, the generated testing interface may be output to a network (e.g., the Internet) for transmission to the device of the product tester 14. Also, in one implementation, item 206 may be performed by the testing interface generator 1100, which opens up a virtual machine environment for presenting the testing interface for the product tester 14 in response to the product tester 14 accepting to take the product testing project.

The testing interface is configured to present features of the product and the product testing instruction for allowing the first product tester 14 to perform the product testing on the product based on the product testing instruction. In some embodiments, the product testing instruction provides a plurality of tasks for the product tester 14 to perform for testing the product. For example, in some cases, the product being tested comprises a web page, and the product testing instruction is configured to prescribe one or more actions be performed on the web page being tested.

Figure 4:
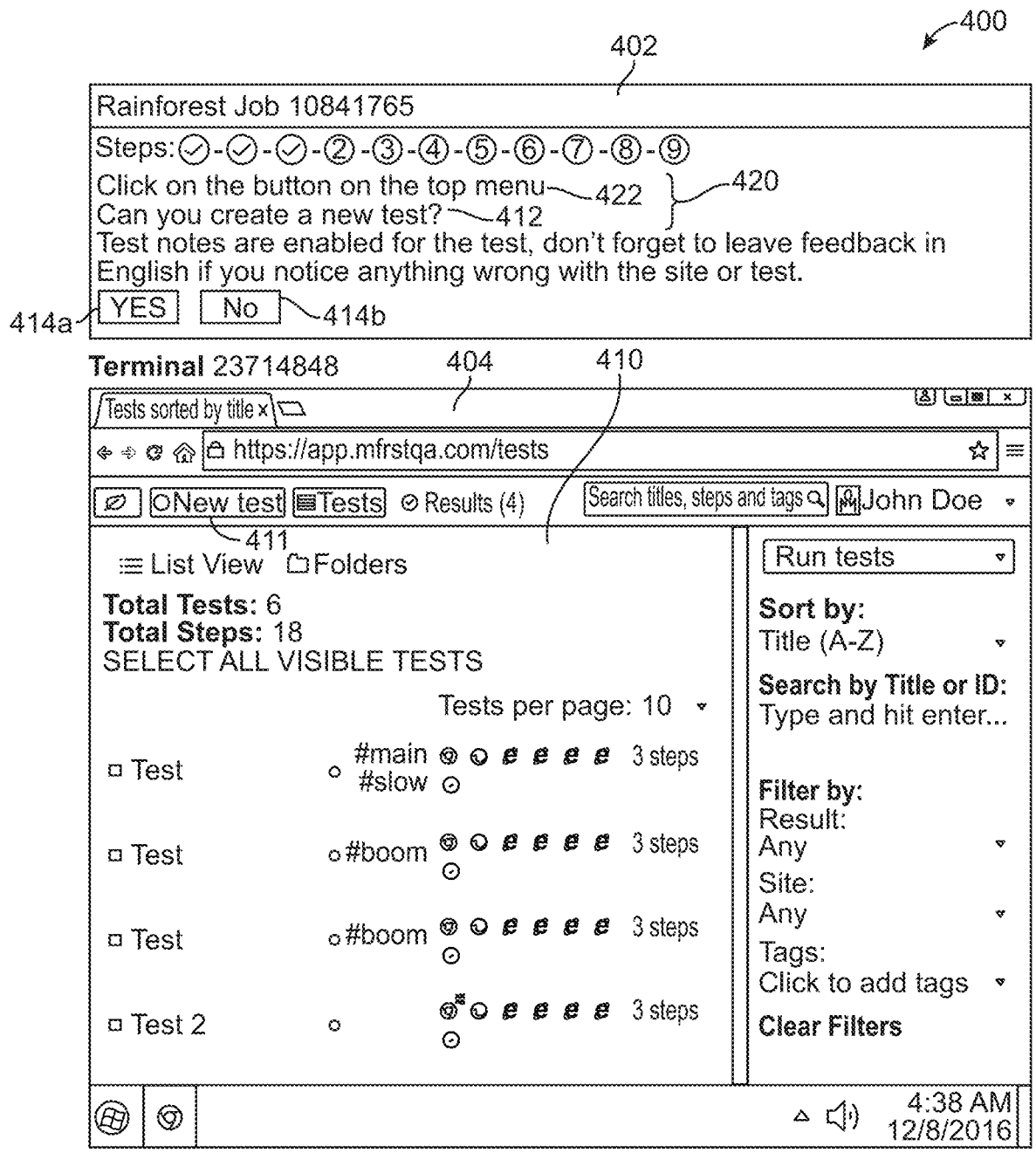
FIG. 4 illustrates an example of a testing environment having a user interface for allowing a product tester to perform product testing.

FIG. 4 illustrates an example of a testing environment 400 having a testing interface 402 for allowing a product tester 14 to perform product testing. The testing interface 402 includes a window 404 for presenting features of the product being tested. In the illustrated example, the product comprises a web page. The window 404 may allow the product tester 14 to access the web page via a link. In response to the product tester 14 entering or clicking the link, the window 404 then presents an image of a web page 410 for allowing the product tester 14 to perform product testing thereon. Also, in the illustrated example, the web page 410 displayed in the window 404 includes one or more selectable features 411. The testing interface 402 includes a field 420 providing one or more tasks 422 for the product tester 14 to perform on the web page 410.

In some embodiments, the tasks 422 are parts of a product testing instruction. A task 422 may require the product tester 14 to perform an action on the image of the web page 410. For example, a task 422 may be to click on a tab on the web page 410, to click on a link on the web page 410, to enter a value in a field in the web page 410, to click on a box in the web page 410, etc.

As shown in FIG. 4, the testing interface 402 may be configured to present a question 412 for the product tester 14 to answer after the action has been performed based on the product testing instruction. For example, the question 412 may ask the product tester 14 whether the product tester 14 sees a pop-up after selecting an object in the web page 410 being tested, whether the product tester 14 sees a new image after selecting a certain option in the web page 410, etc. In the illustrated example, the testing interface 402 also provides only two possible answers 414*a*, 414*b* ("Yes" and "No") for allowing the product tester 14 to select. Such technique reduces ambiguity in the answer provided by the product tester 14. In other embodiments, the testing interface 402 may provide more than two possible answers 414 for allowing the product tester 14 to select to answer a question baser the product tester 14 performs a task specified in the product testing instruction.

In some embodiments, if the product tester 14 selects the "No" answer to any of the product testing question, the system 10 then terminates the product testing session, and the product testing is considered completed by the product tester 14. In such cases, no further product testing tasks and no further product testing questions will be presented to the product tester 14. This is because if the product being tested has a certain feature that fails, then the product provider may want to know this right away. Also, the failed feature may impact other features of the product. Accordingly, if a feature in the product has failed the product testing, then one or more other features may fail as well. In other embodiments, instead of terminating the product testing session, the system 10 may allow the product tester 14 to continue testing the product. For example, the system 10 may allow the product tester 14 to continue with the remaining tasks in the product testing prescribed by the product testing instruction. Also, the system 10 may allow the product tester 14 to test other features of the product that are not associated with the failed feature.

In some embodiments, the method 200 further includes storing an answer of the question in a test result file for the product being tested. As described, the answer may be a "Yes" answer or a "No" answer in response to a question provided to the product tester 14 after the product tester 14 has performed a task to test the product. Thus, in some embodiments, the answer, the question, and the associated task for testing the product may be stored in a unique data structure that associate these items together. FIG. 5 illustrates an example of a data structure 500 for linking product testing tasks 502, respective product testing questions 504, and the corresponding answers 506 to the product testing questions 504. The data structure 500 also includes tracker identifiers 508 that identify files tracking interaction of the product tester 14 while testing the product. Each tracker identifier 508 may identify an image, a video file, or any of other interaction information that captures the interaction of the product tester 14 on the product being tested. These information are advantageous because they allow a user (from party 12 or party 16) to retroactively determine how a product tester 14 came to a conclusion based on the product tester's 14 interaction with the product being tested. The tracker identifier 508 will be described in further detail below.

In some embodiments, the testing interface 402 is configured for display on a computer screen or a laptop screen. In other embodiments, the testing interface 402 is configured for display on a hand-held device (e.g., an iPhone, iPad, iPad mini, tablet, etc.).

It should be noted that the testing interface 402 is not limited to the example discussed previously, and that the testing interface 402 may have other configurations in other embodiments.

Figure 2B:
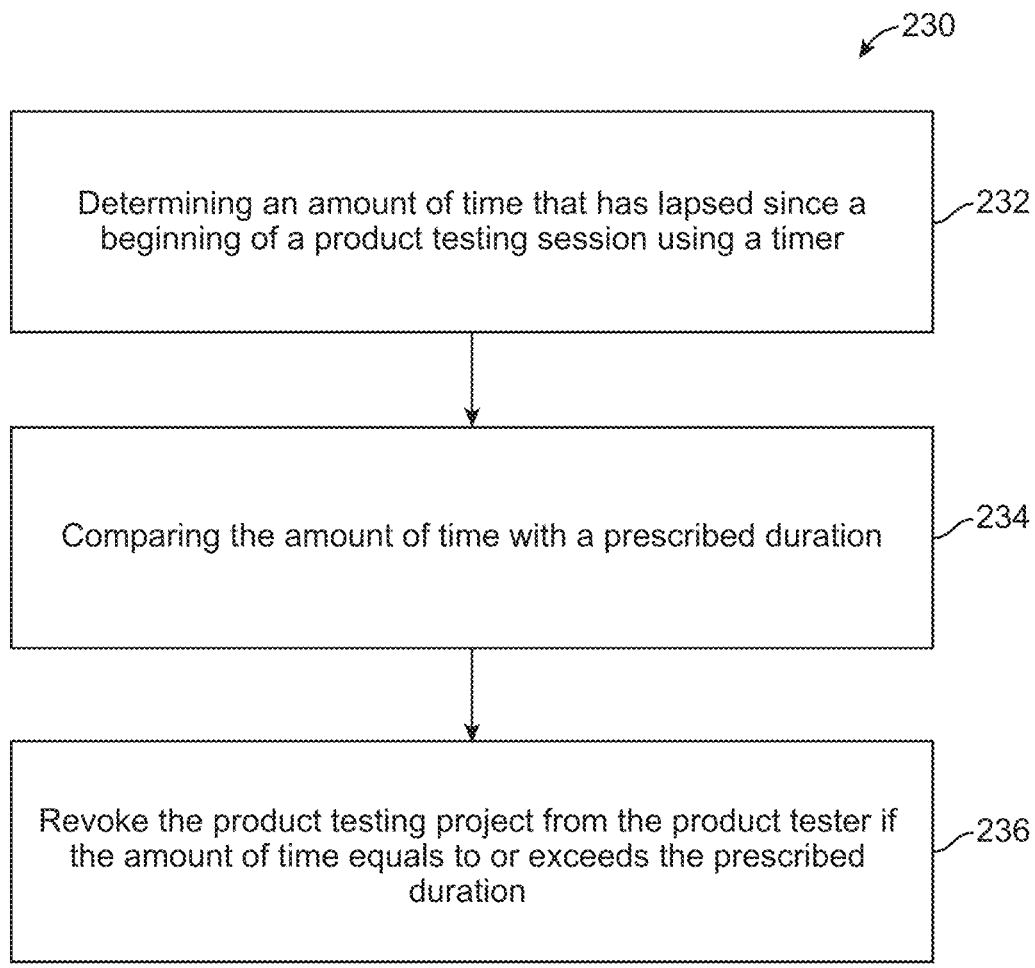
FIG. 2B illustrates a method of tracking a progress of a product testing session.

In some embodiments, after the testing interface 402 is provided to the product tester 14, the timer 1200 in the system 10 keeps track of the duration that has lapsed since the providing of the testing interface 402. In such cases, the method 200 may further include determining (by the timer 1200) an amount of time that has lapsed since the testing interface has been provided to the product tester 14. The method 200 may also include comparing the amount of time with a prescribed duration using the time-comparator 1202. If the lapsed time has exceed a the prescribed duration (e.g., a starting deadline), and the product tester 14 has not begun performing a product testing task, then the system 10 will revoke the product testing project from the product tester 14. For example, the system 10 may terminate the product testing session being used by the product tester 14. In some embodiments, the prescribed duration (starting deadline) may be set by the system 10 to be five minutes after a product testing session has begun. In other embodiments, the prescribed duration may be set by an administrator of the system 10 to have other values, such as a duration that is more than five minutes, or less than five minutes. Accordingly in some embodiments, a method 230 of tracking a progress of a product testing session may be provided (FIG. 2B). The method 230 may be a part of the method 200 in some embodiments. The method 230 includes determining an amount of time that has lapsed since a beginning of a product testing session using a timer (item 232), comparing the amount of time with a prescribed duration (item 234), and revoking the product testing project from the product tester if the determined time equals to or exceeds the prescribed duration (item 236). In some embodiments, the method 200 may also include terminating the product testing session. Also, in one implementation, item 236 may be performed by the testing interface generator 1100, which closes a virtual machine environment presenting the testing interface for the product tester 14 in response to the lapsed time meeting the prescribed duration.

In some embodiments, after the testing interface 402 is provided to the product tester 14, the method 200 further includes tracking an interaction of the product tester 14 with the web page. For example, the product tester 14 may be using his/her device (e.g., laptop, desktop, handheld device, such as a cell phone, etc.) to perform the product testing. In such cases, the tracker 1300 of the system 10 is configured to track a position of the cursor in the product tester's device as operated by the product tester 14. In some cases, if the product tester 14 is using a cell phone with a touchscreen to perform the product testing, the tracker 1300 may be configured to track a position of the finger position as applied on the touchscreen. Thus, as used in this specification, the term "cursor" is not limited to a displayed item operated using a touchpad, a mouse, or a knob, and the term "cursor" may also include non-displayed item that is associated with a movement of a finger as applied on a touchscreen.

In one implementation, the testing interface 402 may instruct the product tester 14 to click on a certain item on an image of a web page being tested. While the product tester 14 is manipulating the cursor in the web page, the tracker 1300 of the system 10 records the positions of the cursor as it appears in the web page. The system 10 may also use the graphic generator 1302 configured to generate a graphic representing the tracked movement. In some embodiments, the graphic comprises a line traversing a plurality of cursor positions. Also, the graphic may further comprise a selection identifier identifying a position in the image of the web page at which the product tester 14 performed a selection (e.g., a clicking of a button). For example, the selection may be a selection of a tab, a selection of a button, a selection of an icon, a selection of a text, or any combination of the foregoing, performed by the product tester 14.

Figure 6:
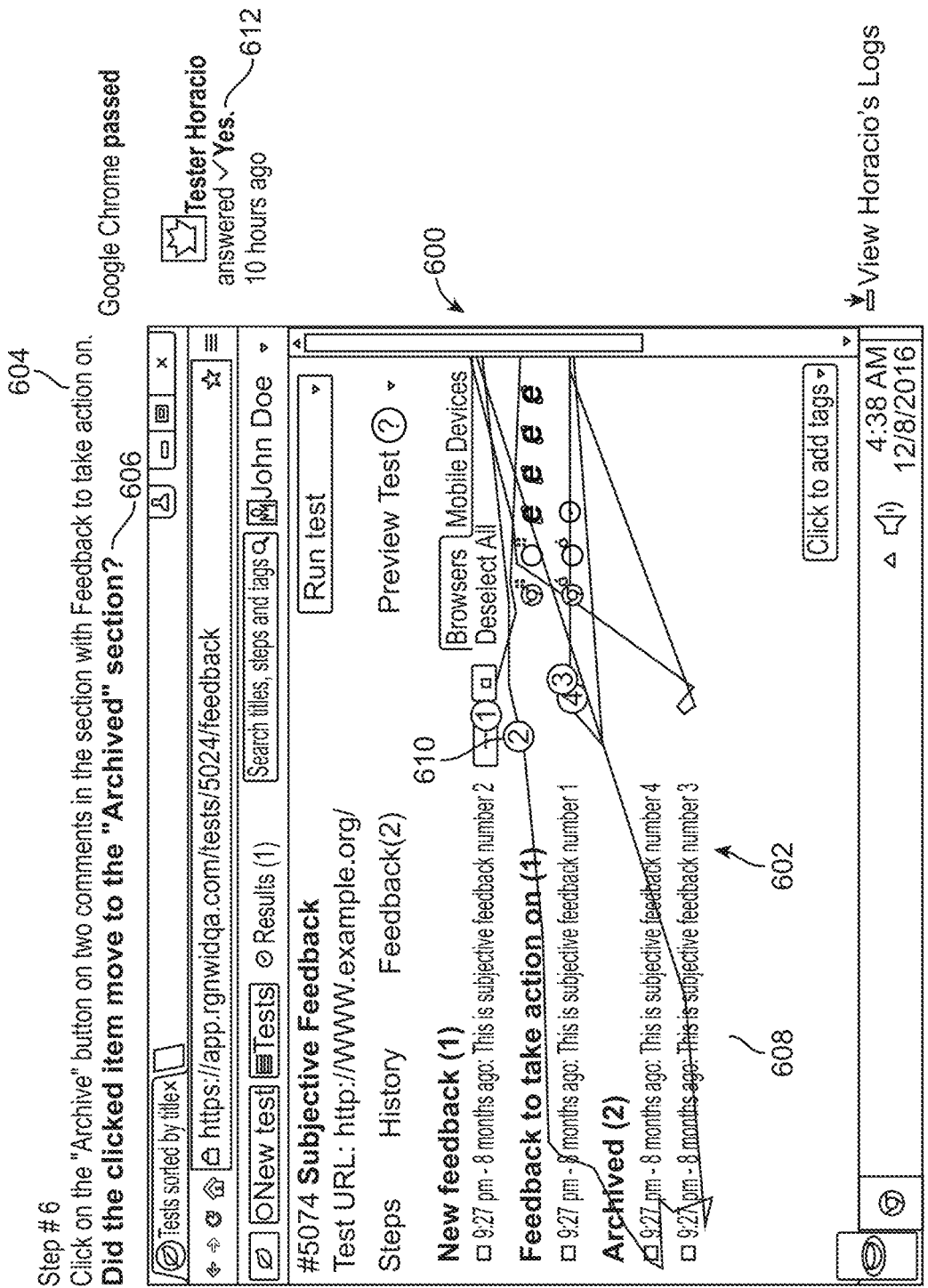
FIG. 6 illustrates an example of an image capturing an interaction of a product tester with a product being tested.

FIG. 6 illustrates an example of an image 600 capturing an interaction of a product tester with a product being tested. As shown in the figure, the image 600 includes an image of a web page 602 being tested, the task 604 prescribed by the product testing instruction, and the question 606 corresponding to the task 604. In the example, the task 604 instructs the product tester 14 to click on the "Archive" button, and the question 606 asks the product tester 14 whether the clicked item moved to the archived section. The image 600 also shows a graphic 608 generated by the graphic generator 1302. The graphic 608 is in a form of a line, which indicates where the product tester 14 has moved the cursor while performing the task 604. The graphic 608 also includes a plurality of circles 610 (example of selection identifiers) identifying a position in the image of the web page at which the product tester 14 has clicked on a button.

In some embodiments, the method 200 may further include storing the electronic image 600 in a non-transitory medium 1304 (FIG. 1B). The non-transitory medium 1304 is illustrated as an image database, but in other embodiments, the non-transitory medium 1304 may be any memory or storage device. The image 200 includes the image of the web page 602 and the graphic 608 superimposed with the image of the web page 602. In one implementation, for a given product testing task, the system 10 is configured to generate positional data regarding the position of the cursor as the product tester 14 interacts with the web page 602 to perform the assigned task. The positional data may include a position (e.g., X and Y coordinates) of the cursor. The positional data may be later used by the graphic generator to generate the graphic 608. For example, all of the positional data may be plotted to create the line shown in the example of the graphic 608 in FIG. 6. Also, in some embodiments, the system 10 may also generate timing data that are associated with the respective positions of the cursor. For example, cursor position (X1, Y1) may occur at t1, and cursor position (X2, Y2) may occur at t2. Thus, the system 10 may generate the timing data t1, t2, etc., and store such timing data in association with the respective cursor positions in the non-transitory medium.

FIG. 7 illustrates an example of a data structure 700 for storing cursor position data in association with timing data. The data structure 700 includes two columns for positional values in the x-coordinate and y-coordinate, respectively. The data structure 700 also includes a column for indicating whether the product tester 14 made a selection (e.g., by clicking a button) at a certain cursor position. In some embodiments, the data structure 700 may be used by the graphic generator 1302 to create the graphic 608 that is associated with an image of a web page being tested. In particular, the positional values in the data structure 700 may be used to create the lines in the graphic 608, and the select indicator(s) in the data structure 700 may be used to create the circle(s) 610 representing the position(s) at which the product tester 14 has made a selection. In some embodiments, the data structure 700 may be stored in the non-transitory medium 1304.

Also, in some embodiments, the data structure 700 may be linked with a certain tracker identifier in the data structure 500 of FIG. 5. For example, the data structure 700 with the identifier "23" may contain data for creating the graphic 608 in the image file 342 in the data structure 500. The image file 342 may contain an image of the web page being tested. In such cases, the data structure [Image file 342; ID=23] may be used to link the data structure 700 with the image file 342. Accordingly, when the system 10 presents an image for indicating a tracked action of a product tester 14 for the task No. 1 listed in the data structure 500, the system 10 will use the above data structure to look up the data structure 700 with the ID "23". The data in the data structure 700 are then used to generate the graphic 608 for presentation with an image of the web page.

As shown in FIG. 7, the data structure 700 may also include timing data indicating the respective times at which the positions of the cursor occurred. The timing data is advantageous because it may allow the graphic 608 to be presented in a form of a video. For example, the video generator 1310 may utilize the data structure 700 to create a video showing a changing of the position of the cursor over time. Thus, the video will indicate a tracked interaction of the product tester 14 with the web page being tested. In some embodiments, the video provided by the video generator 1310 may include a moving cursor. In other embodiments, the video provided by the video generator 1310 may include a growing line representing a collection of positional points by the cursor as the cursor is moved across the web page. In some embodiments, the video may be stored in a non-transitory medium 1314 (FIG. 1B). The non-transitory medium 1314 is illustrated as a video database, but in other embodiments, the non-transitory medium 1314 may be any memory or storage device. Also, in other embodiments, instead of having separate non-transitory media 1304, 1314 as image database and video database, the non-transitory media 1304, 1314 may be integrated as a single database.

The graphic 608 and the image of the web page being tested may be provided by the system 10 to a user associated with the first party 12. For example, in some embodiments, the user interface provided by the user interface generator 1350 may be configured to output an image and/or a video having the graphic 608 and the image of the web page for viewing by the user of the system 10. Such image and/or video may be provided as a part of a test result file so the user can see how the product tester 14 came to a certain product testing conclusion based on the interaction with the web page tested.

In some embodiments, the image and/or the video may be stored in association with the corresponding product testing task defined in the product testing instruction. In particular, the image and/or the video is for tracking the interaction of the product tester 14 while the product tester 14 is performing a certain task prescribed in the product testing instruction. Accordingly, each of the task prescribed to be performed by the product tester 14 will have a corresponding image and/or video tracking the interaction of the product tester 14 with the web page being tested. For example, if a product testing project has 28 tasks (steps), after the product tester 14 has finished the product testing project, the system 10 will have generated 28 images and/or 28 videos for the respective 28 tasks.

In some embodiments, all of the 28 images and/or the 28 videos in the example may be provided, or made available, to the user who is associated with the first party 12 (the provider of the product). In other embodiments, only one image and/or one video may be provided, or made available, to the user who is associated with the first party 12. For example, if a certain task in the product testing results in a "failed" result for the product testing, then the system 10 may provide only the image and/or only the video associated with the failed task. This may be advantageous because the user may not be concerned with tasks that have "pass" status, but may be more interested in viewing results for the task that results in a "failed" status. Furthermore, in some embodiments, the system 10 may store only the image and/or only the video that is associated with a failed task, and may delete other images and videos for other tasks that have "pass" status after the product testing project is completed or after the product testing project is completed for a certain pre-determined duration.

Figure 8A:
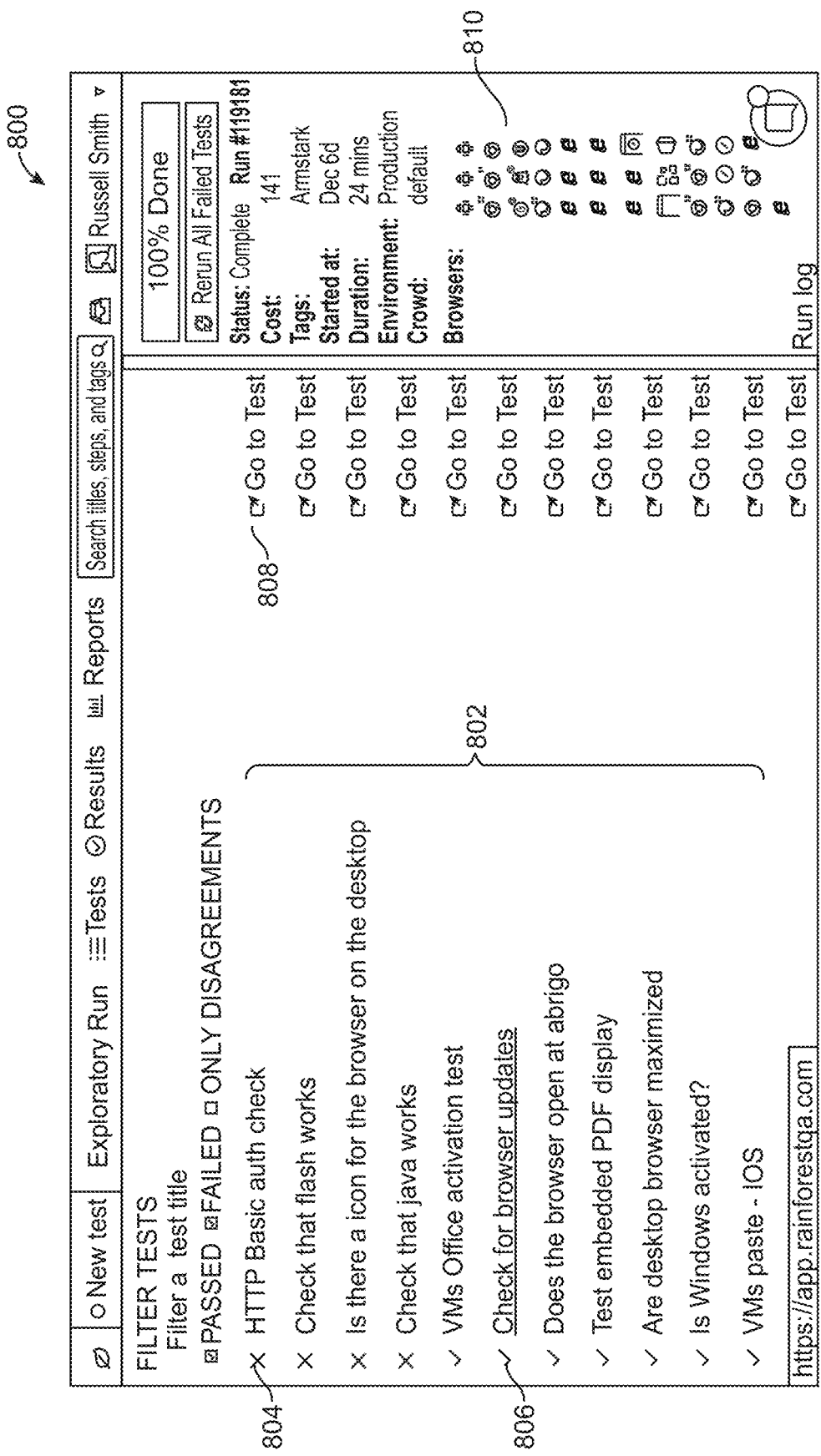
FIG. 8A-8C illustrates an example of a report summarizing a result of a product testing.
Figure 8B:
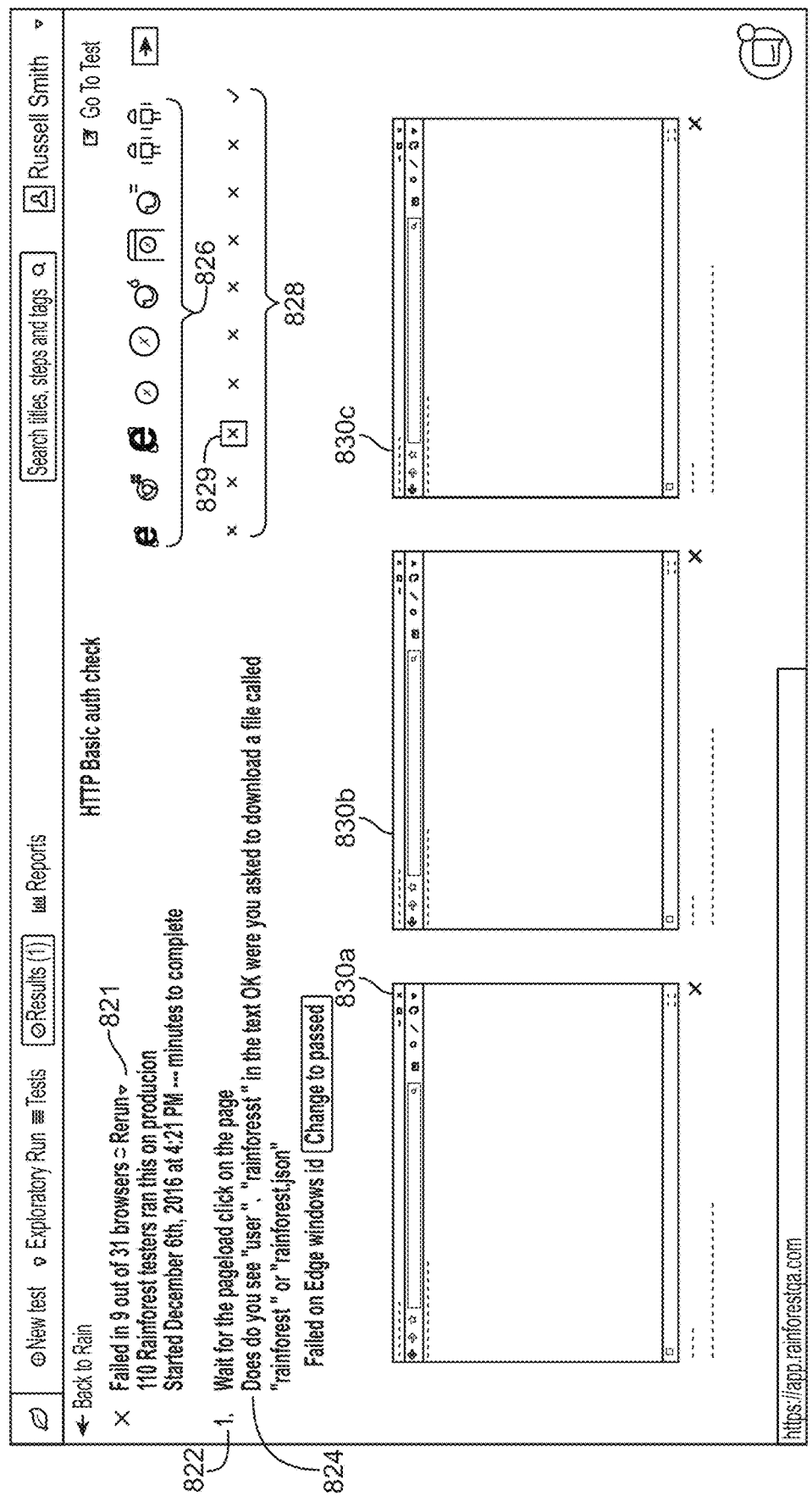
Figure 8C:
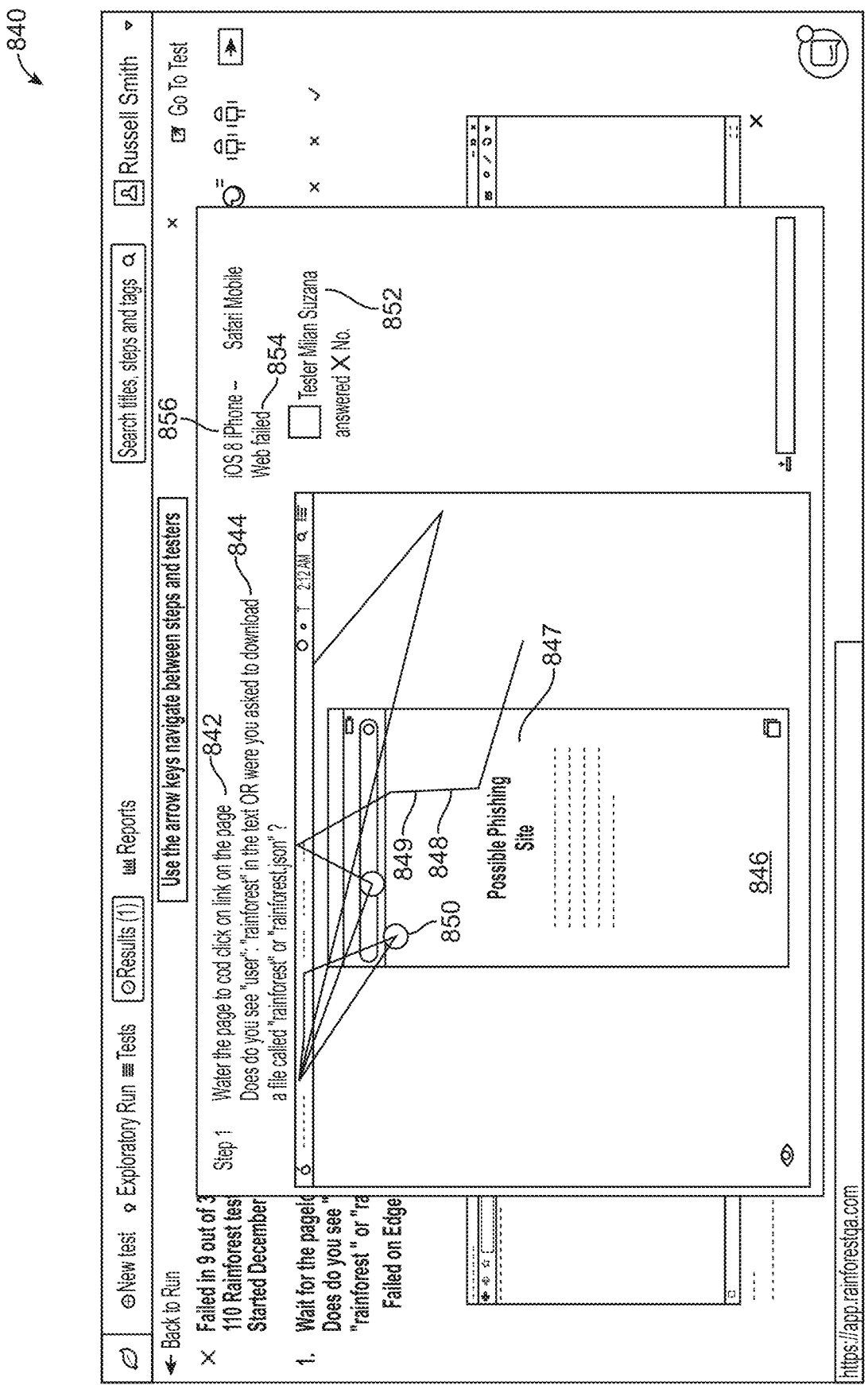

FIG. 8A-8C illustrates an example of a report 800 summarizing a result of a product testing. In some embodiments, the system 10 is configured to gather information from the finished product testing by one or more product testers 14, and generate the report 800 based on the gathered information. In the illustrated example, the report 800 is for a certain product that has been tested by the product testers 14. The report 800 includes a list of product testing tasks 802 performed by the product testers 14. The tasks 802 in the report 800 are the same tasks created (using the user interface provided by the user interface generator 1350) by the user associated with the first party 12 that provides the product for product testing. The report 800 also includes failed test identifier(s) 804 and passed test identifier(s) 806 next to different respective tasks. A task with a failed test identifier 804 indicates that the product testing failed when the product tester(s) performed that task. A task with a passed test identifier 806 indicates that the product testing passed when the product tester(s) 14 performed that task.

As shown in FIG. 8A, the report 800 also includes an object 808 next to each of the tasks, which when selected by the user, will provide further details about the product testing on that specific task. The report 800 also includes a list of browsers 810 in which the product testing of the product has been performed.

In some cases, the user viewing the report 800 may be interested in viewing details of the product testing for a certain task. In such cases, the user may select the corresponding object 808 next to the task 802. In response, the system 10 may present the report 820 shown in FIG. 8B for the user. The report 820 is for a certain task performed during the product testing. As shown in the figure, the report 820 includes a summary 821 of the product testing for that task. In the illustrated example, the summary 821 indicates that the specific task in question failed when the product testers 14 perform the product testing in 9 out of 31 browsers. The report 820 also shows the corresponding task 822 performed by the product testers 14 when the product testing failed, and the corresponding question 824. The 9 browsers in which the performance of the task failed are shown by the browser icons 826. The report 820 also includes pass/fail indicator 828 next to the different respective browser icons 826. In the example, a failed indicator 828 next to a browser icon 826 indicates that the performance of the task failed when the product testers 14 performed the task in the type of browser represented by the browser icon 826.

Also, in the illustrated example, the user viewing the report 820 has selected one of the pass/fail indicators 828 for a certain browser, as represented by the selector graphic 829. Accordingly, the report 820 displays three images 830a-830c that were captured when three respective different product testers 14 performed the task 822 in the browser type selected. From the images 830, the user viewing the report 820 can see what were on the product testers' 14 screen when they performed that specific task that result in a "failed" status.

The user viewing the report 820 can select one of the images 830a-830c to see more detail. For example, when the user selects one of the images 830a-830c, the system 10 may provide a report 840 shown in FIG. 8C to the user. The report 840 includes a description of the task 842, and the corresponding product testing question 844. The report 840 also includes an image 846 that includes an image 847 of the web page tested, and a graphic 848. The graphic 848 includes a line 849 that tracks the position of the cursor when the product tester 14 interacted with the web page, and selection identifiers 850 indicating the positions where the product tester 14 made selections (e.g., clicked a button). The features in the image 846 may be provided by the graphic generator 1302 of the system 10, as similarly discussed with reference to FIG. 6. Thus, image 846 allows the user to retroactively view the interaction of the product tester 14 with the web page while performing the task 842. In other embodiments, instead of a fixed image 846, the system 10 may provide a video showing a movement of the cursor and selection(s) (e.g., clicking of button) by the product tester 14.

As shown in the figure, the report 840 further includes an identifier of the product tester 14 who performed the product testing task. The identifier may be the actual name of the product tester 14 or other identifier that identifies the product tester 14. Also, in some embodiments, the identity of the product tester 14 may be kept confidential and may not be presented by the system 10 to the user.

The report 840 further includes a browser identifier 856 identifying the type of browser in which the task was conducted by the product tester 14, and a pass/fail indicator 854 indicating whether the task in question failed or passed during the product testing.

In some embodiments, the test result reports 800, 820, 840 may be generated using the test result retrieval module 1500 in the system 10. The test result retrieval module 1500 gather information regarding the product testing, and create the reports 800, 820, 840 for viewing by the user. The reports 800, 820, 840 may be presented through an user interface created by the user interface generator 1350 of the system 10. For example, in some embodiments, the user interface generator 1350 may generate and provide an user interface for use by an administrator of the system 10. In such cases, the reports 800, 820, 840 may be provided for viewing by the administrator through the user interface. Alternatively or additionally, the user interface generator 1350 may generate and provide an user interface for use by a user associated with the first party 12 providing the product for product testing. In such cases, the reports 800, 820, 840 may be provided for viewing by the user through the user interface.

It should be noted that the test result reports 800, 820, 840 are not limited by the examples described previously, and that the system 10 may provide test result report(s) having different configurations in different embodiments. For example, in other embodiments, the reports 800, 820, 840 may have fewer information than those described in the above example.

Also, in other embodiments, instead of providing reports associated with all of the product testers 14 for each task, the system 10 may consolidate the product testing results from the multiple product testers 14, and provide a consolidated product testing report to the user. For example, the analyzer 1502 in the system 10 may employ a logical algorithm to determine whether a certain product testing result from a product tester 14 is reliable or not. If the testing result is considered as non-reliable, the analyzer 1502 then disregards that particular product testing result.

As another example, the analyzer 1502 may compare two product testing results from two different product testers 14. If the two product testing results indicate the same conclusion (e.g., pass or fail), then the analyzer 1502 may determine the product testing results as reliable. In such cases, the system 10 may simply report to the user that the particular task in question has a pass or fail status without informing the user the number of product testers 14 performed the testing.

In some cases, if there are three product testers 14 for a particular task, the analyzer 1502 may pick a result (e.g., pass or fail) that has the majority vote. For example, if two product testers 14 performing the task provide a "Yes" answer to the corresponding question, and the third product tester 14 provides a "No" answer, then the analyzer 1502 will pick the "Yes" answer and may determine that the testing of the task has a "pass" status. On the other hand, if two product testers 14 performing the task provide a "No" answer to the corresponding question, and the third product tester 14 provides a "Yes" answer, then the analyzer 1502 will pick the "No" answer and may determine that the testing of the task has a "fail" status.

Accordingly, it is advantageous to have three product testers 14 assigned for a product testing project, and to have only two mutually exclusive answers (e.g., "Yes" and "No") as possibilities for answering the corresponding product testing question. This is because such arrangement allows the analyzer 1502 to be able to decide on a final product testing result even if a product testing result from one product tester 14 contradicts another product testing result from another product tester 14. Also, assigning the same product testing project to multiple product testers 14 allows different results to be compared for detection of non-reliable result. However, in other embodiments, more or fewer than three product testers 14 may be assigned for a product testing project, as discussed, and the number of answers may be more than two. For example, in other embodiments, the answers may be in multiple choice formats with three or more choices.

In some embodiments, the system 10 may be configured to provide a user interface for allowing a user to override a product testing result. For example, the user interface providing the report 800/820/840 may also provide a control for allowing a user to change a product testing result. If a product testing result indicates that a particular task has a "pass" status, the user may utilize the control to change the status from "pass" to "failed". Alternatively, if a product testing result indicates that a particular task has a "failed" status, the user may utilize the control to change the status from "failed" to "pass".

It should be noted that the analyzer 1502 of the system 10 is not limited to comparing product testing results. In other embodiments, the analyzer 1502 may also perform other analyses to determine different user metrics associated with the product testers 14 and/or different testing metrics relating to the reliability of the test results. For example, in some embodiments, the analyzer 1502 may compare the images (which tracked the actions of the product testers 14) stored in the image database 1304 to determine whether the three images are similar or not. If all three product testers 14 perform the same action prescribed by the task of the product testing instruction, the graphics representing the movements of the cursors in the three images may have some similar features. For example, if the product testing task requires the product testers 14 to move the cursor to a link and click on the link, the graphics representing the movement of the cursors should all include one or more selection identifiers at the link. If one of the graphics indicate that there is no selection of the link, the analyzer 1502 may then determine that the product testing result by the corresponding product tester 14 is not reliable. This may be the case even if this product tester 14 provided the same "Yes" or "No" answer to reach the same conclusion as that of the other two product testers 14.

As another example, during a product testing, the testing monitoring module 1400 of the system 10 may gather some intelligence regarding the performance of the product testers 14. After the product testing is finished, the analyzer 1502 may then retrieve the information from the testing monitoring module 1400 and perform further analysis based on the information. For example, the testing monitoring module 1400 may determine an amount of time for each product tester 14 to perform a certain task. Thus, after the product tester 14 finishes the product testing project, the testing monitoring module 1400 will have multiple time values for different respective tasks prescribed in the product testing instruction and performed by that product tester 14. The testing monitoring module 1400 also does the same for the other two product testers 14. After all three product testers 14 have finished the product testing, the analyzer 1502 may then compare the three time values associated with the respective three product testers 14 for a given task, and determine if any of the product testing results for that task from the three product testers 14 is unreliable. For example, if a certain task takes a first product tester 14 to complete in 30 seconds, takes a second product tester 14 to complete in 37 seconds, and a third product tester 14 to complete in 4 seconds, then then analyzer 1502 may determine that the product testing result from the third product tester 14 is unreliable because the other two time values are closer to each other, and the third time value is different from both of the first two time values.

As a further example, when the system 10 provides the task for the product testers 14 to perform based on the pre-determined product testing instruction, the system 10 may insert one or more questions specifically designed to test the reliability of the product testers 14. For example, the system 10 may ask the product tester 14 a simple mathematical question, such as, "what is 14+6?" that is completely unrelated to the nature of the product being tested. If the product tester 14 is actively paying attention while performing the product testing, the product tester 14 is most likely to answer this question correctly. On the other hand, if the product tester 14 is not paying attention while performing the product testing, the product tester 14 may answer this question incorrectly, thereby indicating that the product testing result from this product tester 14 may be unreliable. This technique also has the benefit of detecting certain product tester 14 who may be carless, reckless, or who pretends to be performing the product testing.

Accordingly, in some embodiments, the testing monitoring module 1400 may be configured to compare an answer provided by the product tester 14 with an expected answer. If the answer provided by the product tester 14 matches the expected answer, then the testing monitoring module 1400 may determine that the product testing result by that product tester 14 is reliable. On the other hand, if the answer provided by the product tester 14 does not match the expected answer, then the testing monitoring module 1400 may determine that the product testing result by that product tester 14 is not reliable.

The testing monitoring module 1400 may also perform other functions to monitor a progress of the product testing. For example, the testing monitoring module 1400 may be configured to determine a percentage of the product testing completed, a duration spent by the product tester 14 on the product testing, a number of steps taken by the product tester 14, time wasted by the product tester 14, time lapsed before a link is clicked by the product tester 14, etc.

As discussed, the user interface generator 1350 is configured to provide an interface for a user to generate tasks for product testing and to define product testing parameters. FIG. 9 illustrates an example of a user interface 900 for allowing a user to generate tasks for product testing and to define product testing parameters. The user may be associated with the first party 12 providing the product for product testing, and/or a person associated with the second party 16 providing the system 10. The user interface 900 may be generated and provided by the user interface generator 1350 in the system 10 in some embodiments. In one implementation, after the product provider (first party 12) has registered with the system 10, a user at the first party 12 may then log into the system 10 (e.g., using user ID and password). After the user has logged into the system 10, the user interface generator 1350 of the system 10 may then provide the user interface 900 for the user. In some cases, there may be multiple different product providers (different first parties 12) providing different products for product testing. In such cases, each of the parties 12 will have its own unique set of user ID and password.

As shown in the figure, the user interface 900 includes a section 902 for allowing a user to create product testing tasks 904 and corresponding product testing questions 906. Each product testing task 904 prescribes a product tester 14 to perform an action on the product being tested. Each corresponding question 906 asks the product tester 14 to confirm whether a certain event occurs or not based on the action performed by the product tester 14 in accordance with the assigned task. Accordingly, each of the product testing tasks 904 and each of the product testing questions 906 are designed by the user to test specific features in the product. The user may use the user interface 900 to add, delete, edit, and move task(s) 904 and question(s) 906.

The user interface 900 also includes a section 907 having a plurality of platform/browser icons 908 for selection by the user creating the product testing tasks. Each of the platform/browser icons 908 represents a type of platform or browser in which the web page is desired to be tested. If the user wants the web page to be tested under 34 different types of platform/browser, for example, the user can select the 34 corresponding platform/browser icons 908 to prescribe such testing parameters. By means of non-limiting examples, the platform/browser icons 908 may identify Google Chrome, different versions of Chrome, different versions of Mozilla Firefox, different versions of Microsoft Internet Explorer, different iOS for different versions of iPhone, different versions of Safari, different versions of Android mobile browsers, different versions of iPhone 6 mobile browsers, different versions of Microsoft Office, etc.

Furthermore, in some embodiments, the user interface 900 may allow the user to prescribe how to test an application on a mobile device (e.g., iPhone, iPad, tablet, etc.). For example, the user may prescribe that a product testing be performed on a certain type of mobile device by using the mobile device to launch a browser to go to a website. Alternatively, the user may prescribe that the product testing be performed using mobile-native-device (through an actual mobile device) or mobile-simulator (simulated mobile environment).

In some embodiments, the system 10 is configured to package each product testing under each selected platform/browser as one product testing project (job). Following the above example in which the user has selected 34 different types of platform/browser for testing the product, and assuming that each product testing project is desired to be performed by three product testers 14, the system 10 will then generate 3×34=102 product testing projects. These 102 product testing projects will then be notified to the product testers 14 based on the notification 1005 provided by the notification generator 1004.

Also, in some embodiments, the user designing the product testing instruction may group multiple related web pages under one product testing project. In other embodiments, the product being tested may have multiple web pages, and the user may divide the product into different features for different product testing projects.

In some embodiments, after the user has created the product testing tasks and product testing parameters using the user interface 900, the user may save these information to generate a product testing instruction file. The product testing instruction file may be saved in a non-transitory medium (e.g., the product testing instruction database 1600) at the system 10. When the user determines that the product is ready for product testing, the system 10 is notified, and the notification generator 1004 of the system 10 then provides the notification 1005 to inform the product testers 14 that the product testing project is available, as discussed. When a product tester 14 has accepted the product testing project, the testing interface generator 1100 of the system 10 then provides a testing interface, along with the tasks and questions defined in the product testing instruction (stored in the database 1600) for the product tester 14 to conduct the product testing. Also, as discussed, in some embodiments, the system 10 may insert one or more questions into the product testing instruction specifically designed to test the reliability of the product testers 14. For example, the system 10 may ask the product tester 14 a simple mathematical question, such as, "what is 14+6?" that is completely unrelated to the nature of the product being tested, and that is designed to determine reliability of the product testing result.

Figure 10A:
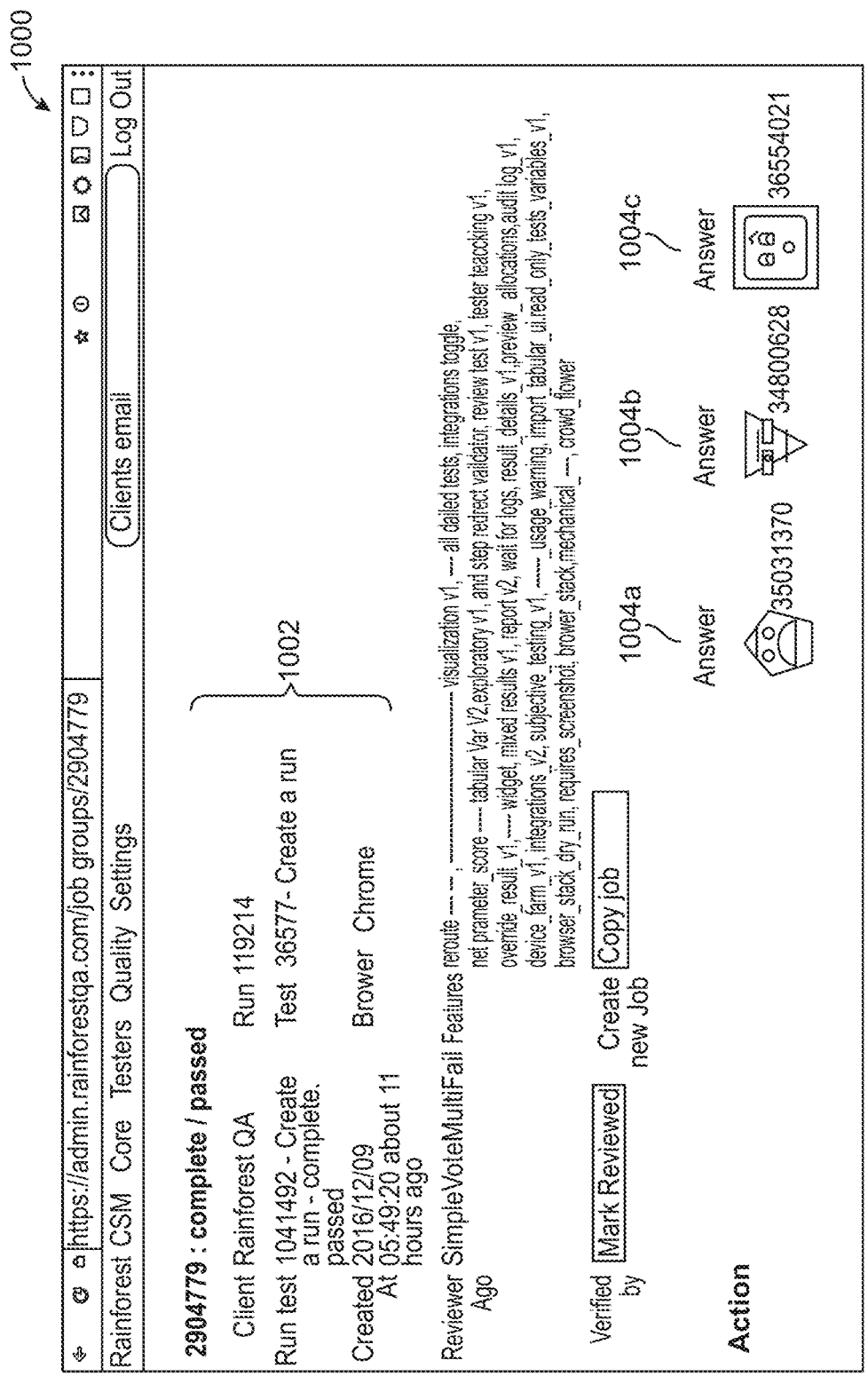
Figure 10B:
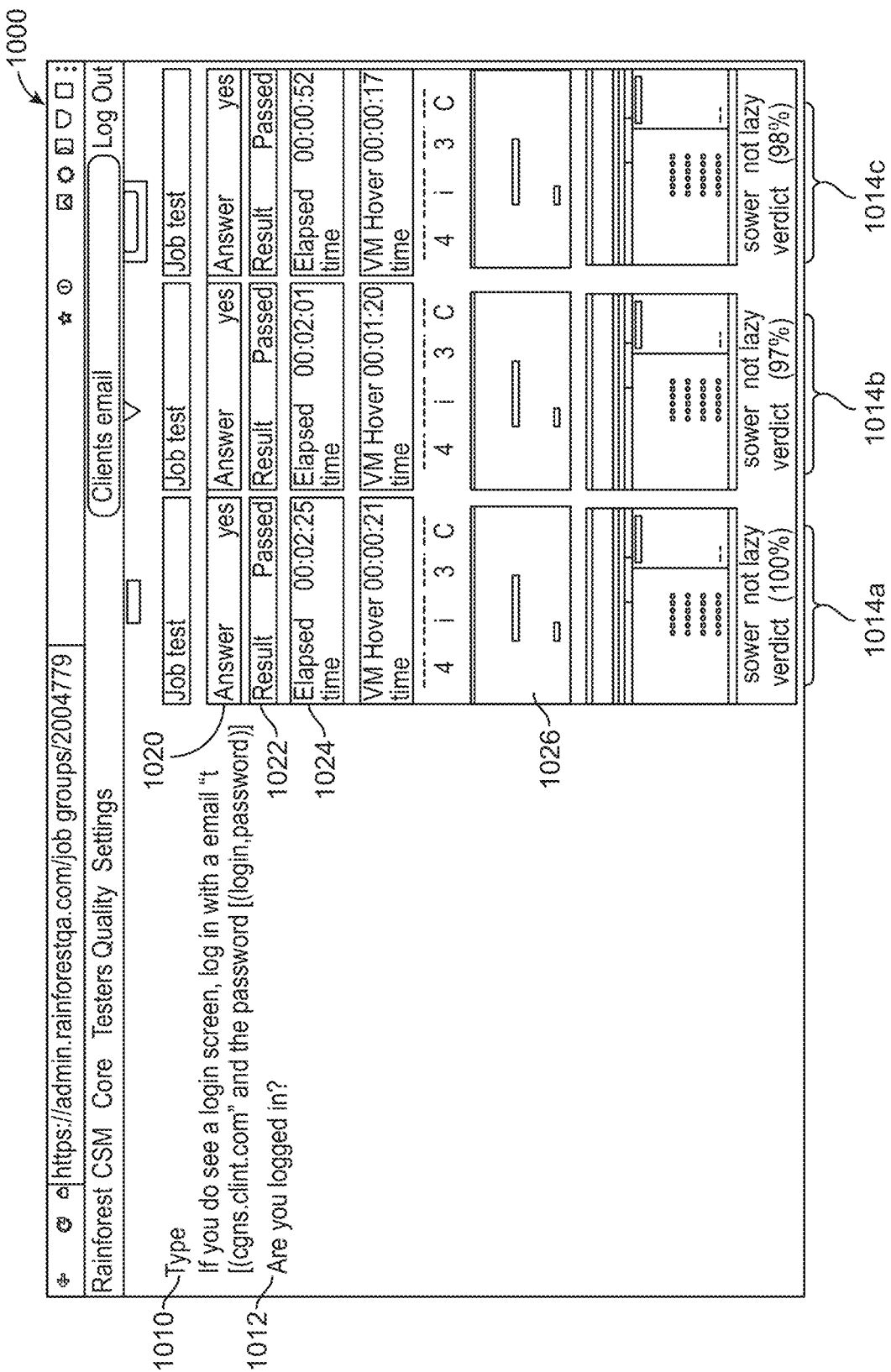
Figure 10C:
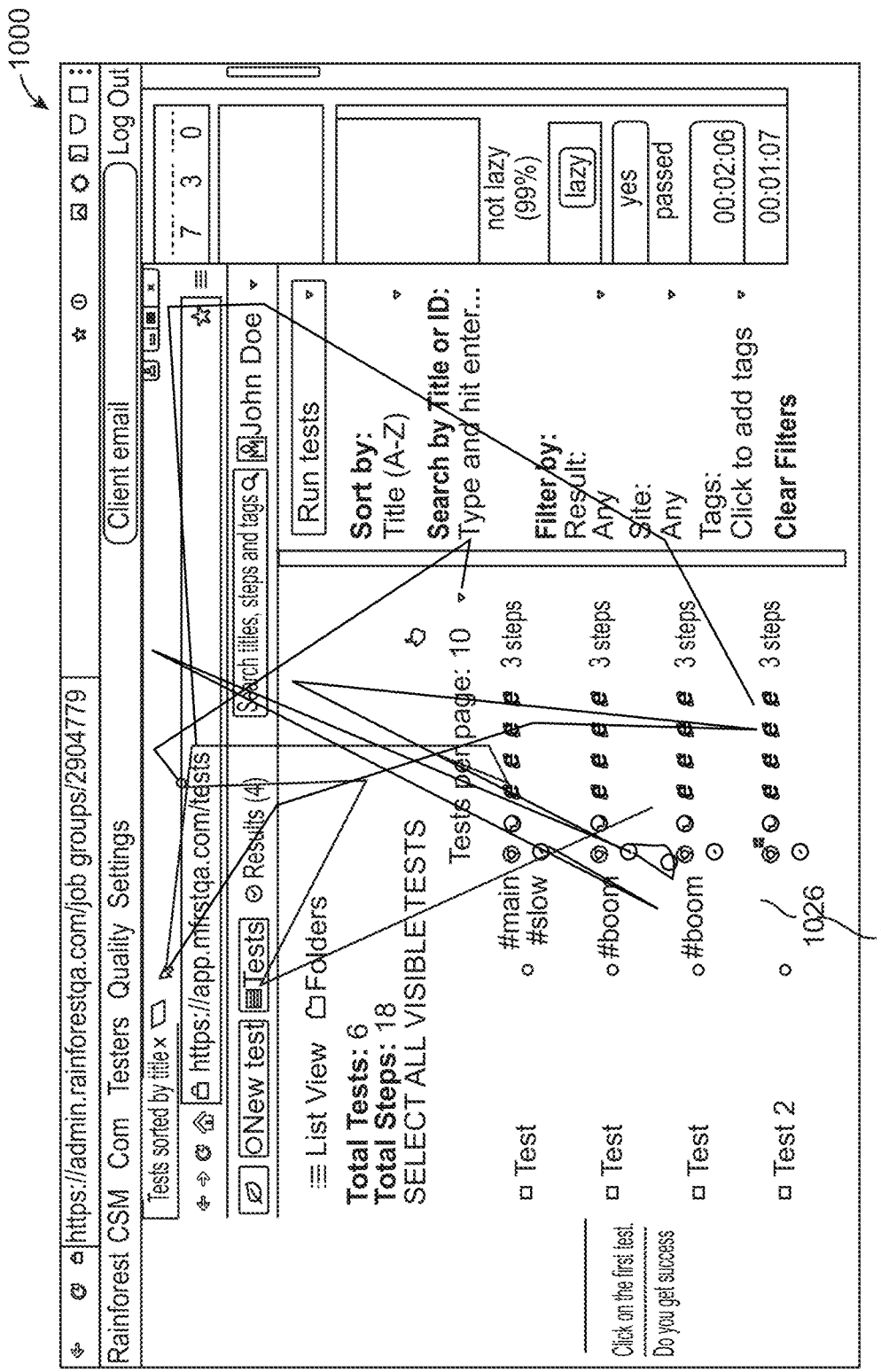
Figure 10D:
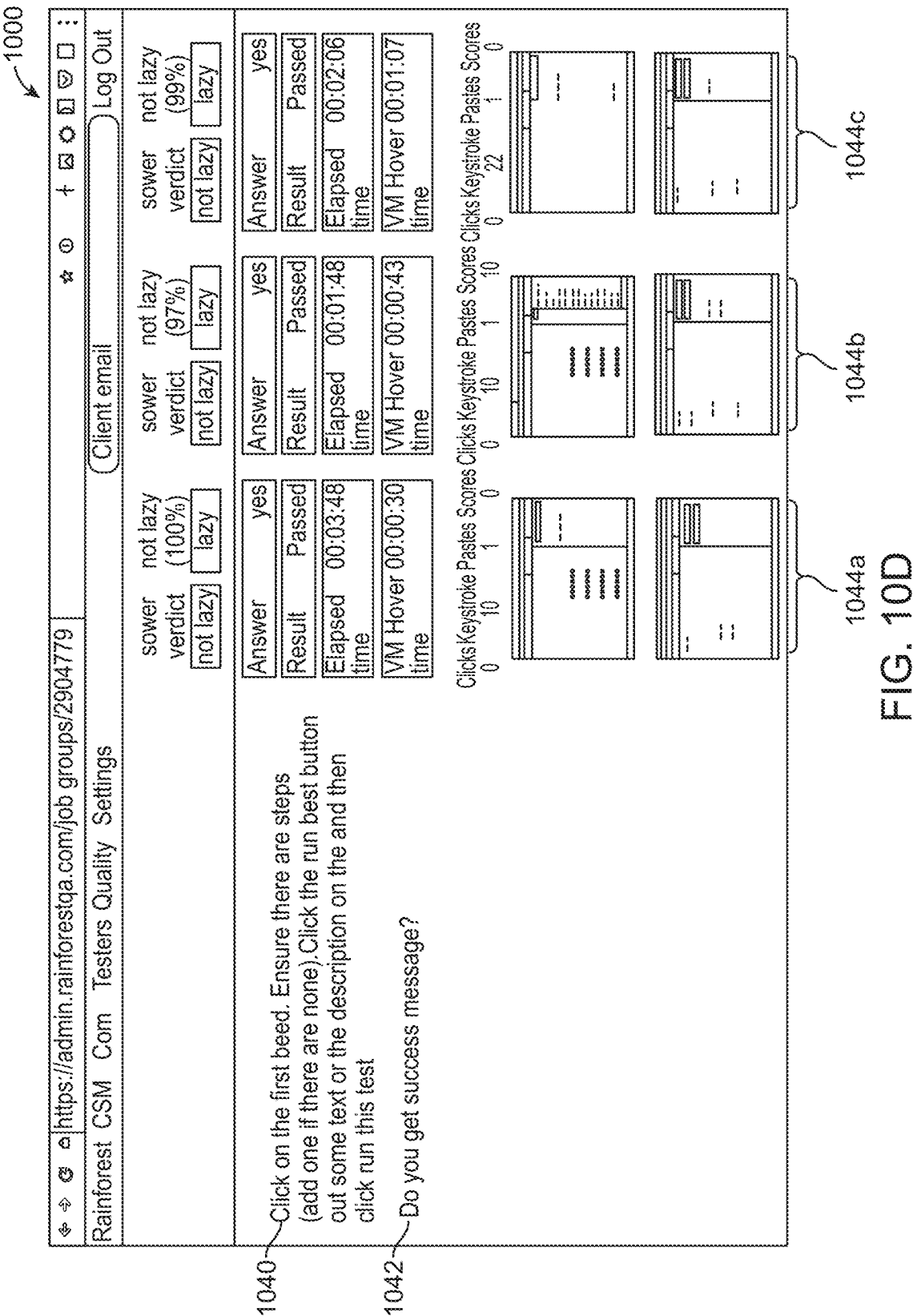
Figure 10E:
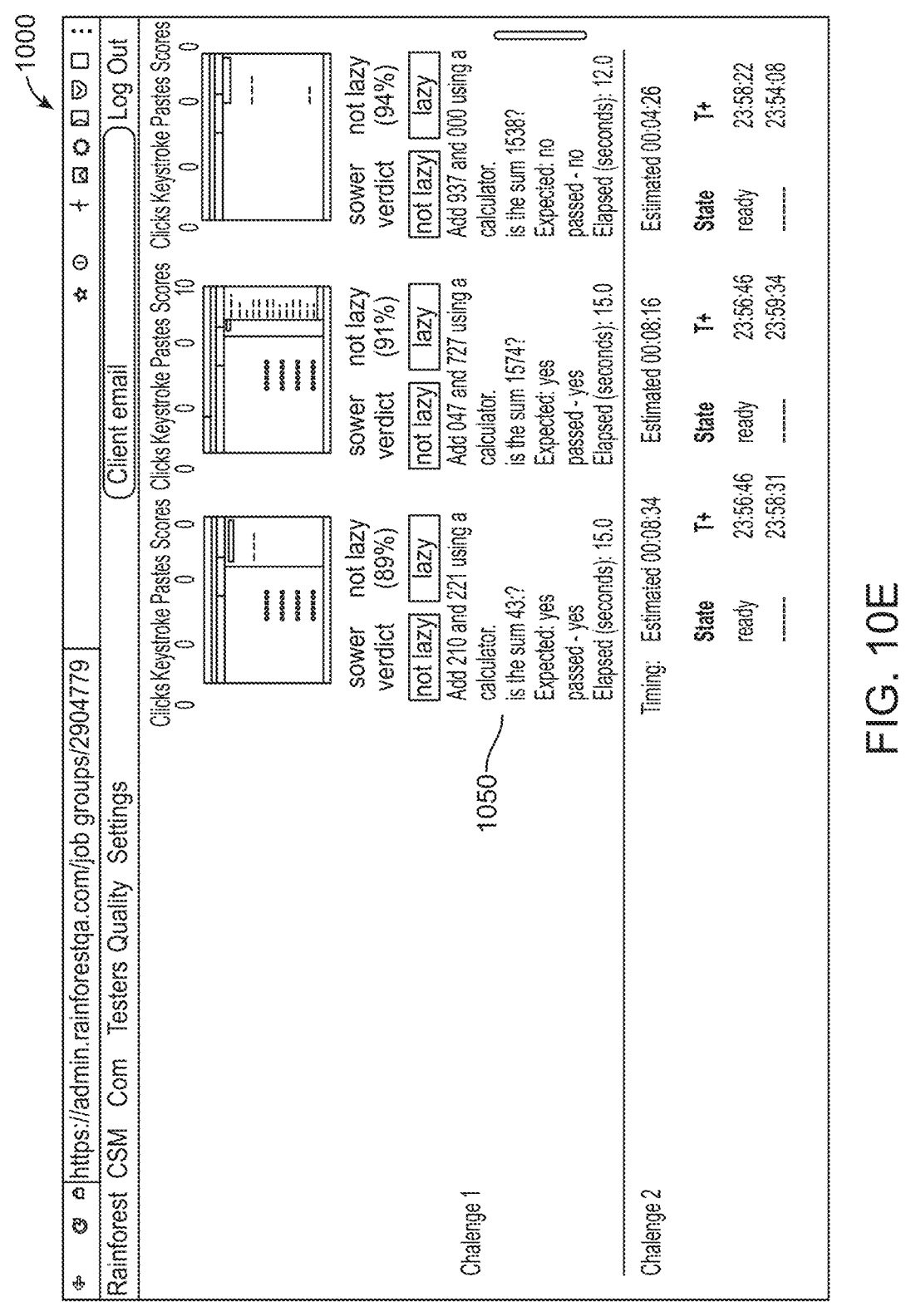

In some embodiments, the system 10 may be configured to provide an administrative product testing report for use by personnel at the second party 16. Such report provides a user at the second party 16 a detailed view of all of the tasks in a product testing. The report may be generated using the test result retrieval module 1500 (which gathers and compiled all of the relevant information), and provided to the user via an user interface generated by the user interface generator 1350. FIGS. 10A-10E illustrate an example of a report 1000 that is for viewing by a user at the second party 16. The report 1000 includes data 1002 regarding the product testing performed, including name of client (product provider), product testing identification, type of platform/browser in which the product testing was conducted, etc. The report 1000 also includes the identifications 1004a-1004c of three product testers 14 who performed the product testing. The report 1000 also includes a summary of the product testing organized by tasks. For example, as shown in FIG. 10B, the report 1000 includes a section that provides the product testing task 1010 and its corresponding product testing question 1012. The report 1000 also includes respective results 1014a-1014c associated with the respective product testers 14. Each result 1014 indicates the product tester's 14 answer 1020 to the product testing question, a pass/fail indicator 1022 indicating whether the performance of the task passes or not, a time value 1024 indicating an amount of time it took for the product tester 14 to complete the task 1010, and an image 1026 that tracked the action of the product tester 14 while performing the task 1010. The image 1026 may be generated by the graphic generator 1302 as similarly discussed previously. In some cases, the user may click on the image 1026, and the system 10 may then provide a more detailed view of the image 1026 (FIG. 10C). The image 1026 includes a graphic that indicates the action of the product tester 14 performed during the product testing, as similarly discussed. As shown in FIG. 10D, the report 1000 may also include respective results 1044a-1044c associated with the respective product testers for a different task 1040, which has a corresponding product testing question 1042. Furthermore, as shown in FIG. 10E, the report 1000 may also include the inserted questions 1050 for the respective product testers 14 that tested the reliability of the product testing results.

As discussed, in some embodiments, the system 10 may be configured to provide a user interface for allowing a user to override a product testing result. For example, the user interface providing the report 1000 may also provide a control for allowing a user (e.g., an administrator, or a personnel associated with the second party 16, etc.) to change a product testing result. If a product testing result indicates that a particular task has a "pass" status, the user may utilize the control to change the status from "pass" to "failed". Alternatively, if a product testing result indicates that a particular task has a "failed" status, the user may utilize the control to change the status from "failed" to "pass".

The system 10 of FIG. 1B will now be described in further detail. The system 10 includes one or more input(s) 1002 for receiving a product testing request, information about the product, and product testing instruction. The system 10 also includes a notification generator 1004 configured to generate a notification 1005 to inform a plurality of product testers 14 that a product is available for product testing. As discussed, in some embodiments, the product is associated with the first party 12 developing the product, and the notification generator 1004 is associated with the second party 16 that is not the same as the first party 12.

In some embodiments, the notification 1005 is for display in a web browser. For example, the product tester 14 may open a web browser on his/her device. The web browser may include an add-on feature, which allows the product tester 14 to receive the notification 1005 from the system 10. In other embodiments, the notification 1005 may be for display in a field created by a product testing notification application.

For example, the product tester 14 may install a product testing notification application onto his/her device, which allows the product tester 14 to receive the notification 1005 from the system 10.

In further embodiments, the notification may be transmitted to crowdflower or a mechanical turk.

The system 10 also includes a communication interface 1008 configured to receive an electronic reply 1010 from a device 1020 being used by a first product tester 14 of the plurality of product testers, the reply 1010 indicating that the first product tester 14 will perform the product testing. In some embodiments, the communication interface 1008 and the one or more input(s) 1002 may be integrated.

In some cases, the electronic reply 1010 may be generated using a web browser utilized by the product tester 14. For example, as similarly discussed, the web browser on a device utilized by the product tester 14 may include an add-on feature, which allows the product tester 14 to receive the notification from the system 10. The same add-on feature may also allow the product tester 14 to provide his/her reply (for reception by the system 10) to accept or to sign up for a product testing project.

In other cases, the electronic reply 1010 may be generated using a product testing notification application utilized by the product tester 14. For example, as also similarly discussed, the product tester 14 may install a product testing notification application onto his/her device, which allows the product tester 14 to receive the notification from the system 10. The same product testing notification application may also allow the product tester 14 to provide his/her reply (for reception by the system 10) to accept or to sign up for a product testing project.

As similarly discussed, in other embodiments, the electronic reply may be generated by a device that is using crowdflower or a mechanical turk.

In some embodiments, the system 10 may also include a reply counter 1040 configured to keep track with a number of replies 1010, and a comparator 1042 configured to compare the number of replies 1010 with a prescribed number. In some embodiments, the communication interface 1008 is configured to receive one or more additional electronic replies from one or more additional product testers 14 from the plurality of product testers 14 until a prescribed number of electronic replies has been reached. In response to each reply received by the communication interface 1008, the reply counter 1040 will increment by one. The communication interface 1008 continues to receive additional reply until the total number of replies is equal to the prescribed number of electronic replies, as determined by the comparator 1042. In the illustrated embodiment, the prescribed number of replies is one reply. In other embodiments, the prescribed number of replies may be more than one. For example, in some embodiments, the prescribed number of electronic replies may be three, four, five, six, or seven. In other embodiments, the prescribed number of electronic replies may two. In further embodiments, the prescribed number of electronic replies may be more than seven.

In some embodiments, the system 10 may further include a filter 1050 configured to select the plurality of product testers 14 from a list of available product testers 14 for providing the notification. For example, by means of non-limiting examples, the filter 1050 may be configured to select the plurality of product testers based at least in part on respective scores of the plurality of product testers, respective ages of the plurality of product testers, respective language skills of the plurality of product testers, respective locations of the plurality of product testers, respective age groups of the plurality of product testers, respective industry expertise of the plurality of product testers, or any combination of the foregoing. Also, in one example, if a product is desired to be tested by individuals who can read Italian, the filter 1050 may then perform filtering to obtain a list of all product testers 14 who can read Italian. In such cases, the notification 1005 may be provided by the notification generator to only the product testers 14 who can read Italian.

The system 10 further includes a testing interface generator 1100 configured to generate a testing interface for use in a testing environment. The testing interface may be the testing interface described with reference to FIG. 4. In other embodiments, the testing interface may have other configurations. As similarly discussed, the testing interface is configured to present features of the product and product testing instruction for allowing the first product tester 14 to perform the product testing on the product based on the product testing instruction. The product testing instruction in the testing interface is configured to provide a plurality of tasks for testing the product. For example, the product testing instruction may prescribe one or more actions be performed by the product tester 14 on a web page being tested. In some embodiments, the testing interface is configured for display on a hand-held device (e.g., an iPhone, iPad, iPad mini, tablet, etc.). In other embodiments, the testing interface is configured for display on a computer screen or a laptop screen.

In some embodiments, the product testing instruction may be created by a user through an user interface provided by the user interface generator 1350. The user creating the product testing instruction may be associated with the first party 12 providing the product for testing, or may be associated with the second party 16. The user interface allows the user to create multiple product testing tasks, and multiple corresponding product testing questions, to test a product. In some cases, the product includes a web page, and the user interface allows the user to select one or more platforms/browsers in which to test the web page. The product testing instruction may be stored in the product testing instruction database 1600.

In some embodiments, the user interface generator 1350 may be configured to provide a first product tester 14 access to a testing environment for allowing the first product tester 14 to perform product testing on a product based on the product testing instruction. The user interface generator 1350 may also be configured to provide a second product tester 14 access to another testing environment for allowing the second product tester 14 to perform another product testing on the same product based on the same product testing instruction. In one implementation, the user interface generator 1350 may provide different virtual environments for different respective product testers 14. Accordingly, different product testers 14 may perform the product testing on different respective virtual machines that provide the testing interfaces for testing the product.

Also, in some embodiments, the testing interface is configured to present an image of a web page (e.g., a web page being tested), and the product testing instruction is configured to instruct the first product tester 14 to perform an action on the image of the web page being tested. The testing interface may further be configured to present a question for the first product tester 14 to answer after the action has been performed based on the product testing instruction. The system 10 may further include a non-transitory medium for storing the product tester's answer to the question in a test result file.

In some embodiments, the system 10 also includes a timer 1200 that keeps track of the duration that has lapsed since the testing interface 402 was provided to the product tester 14. The system 10 also includes a time-comparator 1202, which compares the lapsed time with a prescribed threshold. If the lapsed time has exceeded the prescribed threshold and the product testing is not completed by the product tester 14, then the system 10 will revoke the product testing project from the product tester 14. For example, the system 10 may terminate the product testing session being used by the product tester 14. In some embodiments, in response to the revoked product testing project from the product tester 14, the system 10 will update the reply counter 1040 (e.g., by subtracting the total count by one) to indicate that a slot for the product testing project is available (due to the product testing project being released back to the pool of product testers 14 for acceptance). If another product tester 14 submits a reply to take the slot for the product testing project, the product testing project (which was not completed by the previous product tester 14) is then assigned to this other product tester 14.

As shown in FIG. 1B, the system 10 also includes a tracker 1300 configured to track an interaction of the first product tester 14 with the product. In some embodiments, the product may be a web page, and the tracker 1300 is configured to track an interaction of the first product tester 14 with an image of the web page.

Also, in some embodiments, the tracker 1300 is configured to track a movement of a cursor operated by the first product tester 14. For example, the first product tester 14 may be using his/her device (e.g., laptop, desktop, handheld device, such as a cell phone, etc.) to perform the product testing. In such cases, the tracker 1300 is configured to track a position of the cursor in the product tester's device as operated by the first product tester 14. In some cases, if the product tester 14 is using a cell phone with a touchscreen to perform the product testing, the tracker 1300 may be configured to track a position of the finger position as applied on the touchscreen. Thus, as used in this specification, the term "cursor" is not limited to a displayed item operated using a touchpad, a mouse, or a knob, and the term "cursor" may also include non-displayed item that is associated with a movement of a finger as applied on a touchscreen.

Also, in some embodiments, the tracker 1300 is configured to track a selection of a tab, recording a selection of a button, recording a selection of an icon, recording a typed text, or any combination of the foregoing, performed by the first product tester 14.

The system 10 further includes a graphic generator 1302 configured to generate a graphic representing the tracked movement by the tracker 1300. In some embodiments, the graphic comprises a line traversing a plurality of cursor positions. In some embodiments, the graphic may also comprises a selection identifier identifying a position in the image of the web page at which the first product tester 14 performed a selection.

The system 10 may also include an image database 1304 configured to store an electronic image in a non-transitory medium, the electronic image comprising the image of the web page and the graphic superimposed with the image of the web page. In some embodiments, the image database 1304 is configured to store the electronic image in association with an identity of the first product tester 14 and in association with the product being tested. The image database 1304 may be one or more non-transitory medium located at a same facility or at different facilities.

Alternatively or additionally, the system 10 may further include a video generator 1310 configured to generate a video of the tracked interaction. In some embodiments, the video may show a movement of a cursor as operated by the product tester 14 while testing a web page. The video may also show a selection of an object in the web page by the product tester 14. In one implementation, the video may be a recording of screenshots over time to show an interaction of the product tester 14 with the web page being tested. In other embodiments, the video may contain images of a processor-generated graphic (tracking an interaction of the product tester 14) superimposed with image(s) of the web page being tested. For example, the graphic may be a "growing" line that follows a position of a cursor, thereby representing cursor positions over time. In some embodiments, the video may also show a selection identifier identifying a position in the image of the web page at which the first product tester 14 performed a selection (e.g., a clicking operation). For example, the graphic may include an identifier (e.g., a circle) placed on the "growing line" wherever the product tester 14 performs a clicking operation.

In some embodiments, the system 10 may also include a video database 1314 configured to store the video in a non-transitory medium. In some embodiments, the video database 1314 is configured to store the video in association with an identity of the first product tester 14 and in association with the product being tested. The image database 1314 may be one or more non-transitory medium located at a same facility or at different facilities.

As shown in FIG. 1B, the system 10 also includes a testing monitoring module 1400 configured to monitor a progress of the product testing. By means of non-limiting examples, the testing monitoring module 1400 is configured to determine a percentage of the product testing completed, a duration spent by the first product tester, a number of steps taken by the first product tester, time wasted by the first product tester, time lapsed before a first link is clicked by the first product tester, etc.

The system 10 further includes a test result retrieval module 1500 configured to obtain a first testing result achieved by the first product tester 14 completing the product testing. The test result retrieval module 1500 is also configured to obtain additional testing result(s) from one or more additional product tester(s) 14. For example, the test result retrieval module 1500 may be configured to also obtain a second testing result achieved by the second product tester 14 completing the product testing. The system 10 further includes an analyzer 1502 configured to analyze the first testing result and the second testing result to determine whether the first testing result, the second testing result, or both of the first testing result and the second testing result, are reliable or not.

In some embodiments, the analyzer 1502 may also be configured to use other information obtained by the testing monitoring module 1400, to determine whether one or more of the product testing results are reliable or not.

The test result retrieval module 1500 may be configured to generate one or more product testing reports, such as those shown in FIGS. 8A-8C and FIGS. 10A-10E. The product testing reports may be provided to one or more users through one or more user interface(s) provided by the user interface generator 1350. For example, one or more reports may be provided to a user associated with the first party 12 providing the product being tested. As another example, one or more reports may be provided to an administrator or another user associated with the second party 16.

Although the system 10 has been described with reference to connecting a product tester 14 with a certain product testing project to test a certain product created by a party 12, in other embodiments, the system 10 may connect multiple product testers 14 to a certain product testing project. In one implementation, the testing interface module is configured to provide multiple instances of the testing interface to multiple product testers 14. For example, the testing interface (e.g., an instance of it) may provide the features of the product and the product testing instruction for allowing a second product tester 14 to perform the product testing on the product based on the product testing instruction. Also, in some embodiments, the system 10 may be configured to provide multiple instances of virtual testing environment for multiple product testers 14 to perform product testing.

In addition, in other embodiments, the system 10 may connect multiple product testers 14 to multiple product testing projects to test different products created by different parties 12.

It should be noted that the system 10 may be implemented using a single device, or using a plurality of devices. For example, the entire system 10 may be implemented on a server in some embodiments. In other embodiments, different components of the system 10 may be implemented on different machines, or on different sets of machines. For example, in some embodiments, the input(s) 1002, the notification generator 1004, the communication interface 1008, the reply counter 1040, the comparator 1042, and the filter 1050 may be implemented using a first set of one or more devices, the testing interface generator 1100 may be implemented using a second set of one or more devices, the tracker 1300, the graphic generator 1302, and the video generator 1310 may be implemented using a third set of one or more devices, the testing monitoring module 1400 may be implemented using a fourth set of one or more devices, and the test result retrieval module 1500 and the analyzer 1502 may be implemented using a fifth set of one or more devices. A device may be a processor, a computer, a server, a database, etc.

Although the above embodiments have been described with reference to testing a product that is a web page or a web site, in other embodiments, the system and method described herein may be applied to test other products. By means of non-limiting examples, the product may be any software, any hardware, any physical device, or any computer modeling.

Also, in some embodiments, a component in the system 10 may be partially or completely implemented at a product tester's 14 device or at a device used by the first party 12 (e.g., a computer at the provider of the product being tested). For example, in some embodiments, all or a part of the testing interface generator 1100 may be implemented at a product tester's 14 device. In one implementation, a product tester may install an application provided by the second party 16 onto a device (e.g., a laptop, a desktop computer, a handheld device, etc.) of the product tester 14, which allows the device to display a testing interface in response to the product tester 14 accepting a product testing project. The same application may also be installed by multiple product testers 14.

Similarly, all or a part of the tracker 1300, all or a part of the graphic generator 1302, and/or all or a part of the video generator 1310 may be implemented at a product tester's 14 device. In one implementation, a product tester may install an application provided by the second party 16 onto a device (e.g., a laptop, a desktop computer, a handheld device, etc.) of the product tester 14, which allows the device to track an action of the product tester 14 as the product tester 14 is using the device to perform the product testing, and to generate images and/or videos capturing the action of the product tester 14. The same application may also be installed by multiple product testers 14.

As another example, all or a part of the user interface generator 1350 may be implemented at a product provider's (first party's 12) device. In one implementation, a product provider may install an application provided by the second party 16 onto a device (e.g., a laptop, a desktop computer, a handheld device, etc.) of the product provider, which allows the product provider to use its device to create product testing instruction, select product testing parameters, and provide information regarding the product that is desired to be tested. The application also allows the device at the product provider to view product testing results transmitted by the system 10. The same application may also be installed by multiple product providers 12.

Accordingly, the system 10 described herein is not limited to one or more devices associated with the second party 16, and may include one or more devices being used by the product testers 14, and/or one or more devices being used by users at the product provider (the first party 12).

Furthermore, in some embodiments, any of the components of the system 10 may be implemented using hardware, software, or a combination of hardware and software. For example, each of the items below may be implemented using a hardware, software, or a combination of both: the one or more input(s) 1002, the notification generator 1004, the communication interface 1008, the reply counter 1040, the comparator 1042, the filter 1050, the product tester management module 1080, the testing interface generator 1100, the timer 1200, the time-comparator 1202, the tracker 1300, the graphic generator 1302, the video generator 1310, the user interface generator 1350, the testing monitoring module 1400, the test result retrieval module 1500, the analyzer 1502.

Also, in some embodiments, a processor-readable medium including a set of instructions for providing one or more features described herein is provided. The instructions in the processor-readable medium, when executed by a processing unit, will cause a method for providing a product testing to be performed. The instructions may include: instruction for providing a notification to inform a plurality of product testers that a product is available for product testing, wherein the product is associated with a first party and the notification generator is associated with a second party that is not the same as the first party; instruction for receiving an electronic reply from a device being used by a first product tester of the plurality of product testers through a network, the reply indicating that the first product tester will perform the product testing; instruction for updating a reply count in response to the received electronic reply; and instruction for, in response to the electronic reply, providing a testing environment that comprises a testing interface for the first product tester, the testing interface presenting features of the product and the product testing instruction for allowing the first product tester to perform the product testing on the product based on the product testing instruction, the product testing instruction providing a plurality of tasks for testing the product.

As illustrated in the above embodiments and examples, the system 10 and the method 200 described herein are advantageous because they allow a product to be tested efficiently under multiple different testing parameters. For example, a software application may be tested under 10 different platforms by multiple product testers 14. Because the product testing may be performed by multiple product testers 14 in parallel, the user at the product provider can obtain product testing results very quickly. Also, because multiple product testers 14 can be assigned to perform each product testing (e.g., testing an application under a certain platform), the product test result being provided to the product provider can be very accurate and reliable. More importantly, the above benefits are provided for the product provider without the need for the product provider searching for qualified product testers. Accordingly, embodiments and features of the system 10 and the method 200 described herein have practical and real world utility, and they create tangible and concrete results that significantly improve the way product testing is performed.

Electronic System for Evaluating Product Testing

In some embodiments, an electronic system for evaluating product testing may be provided. The electronic system (electronic evaluator) may be implemented as a part of the system 10, or alternatively, as a separate item that is communicatively coupled to the system 10. The electronic system may be configured to evaluate product testing performed for a product, and determine whether the product testing adequately cover the various aspects of the product.

Figure 11:
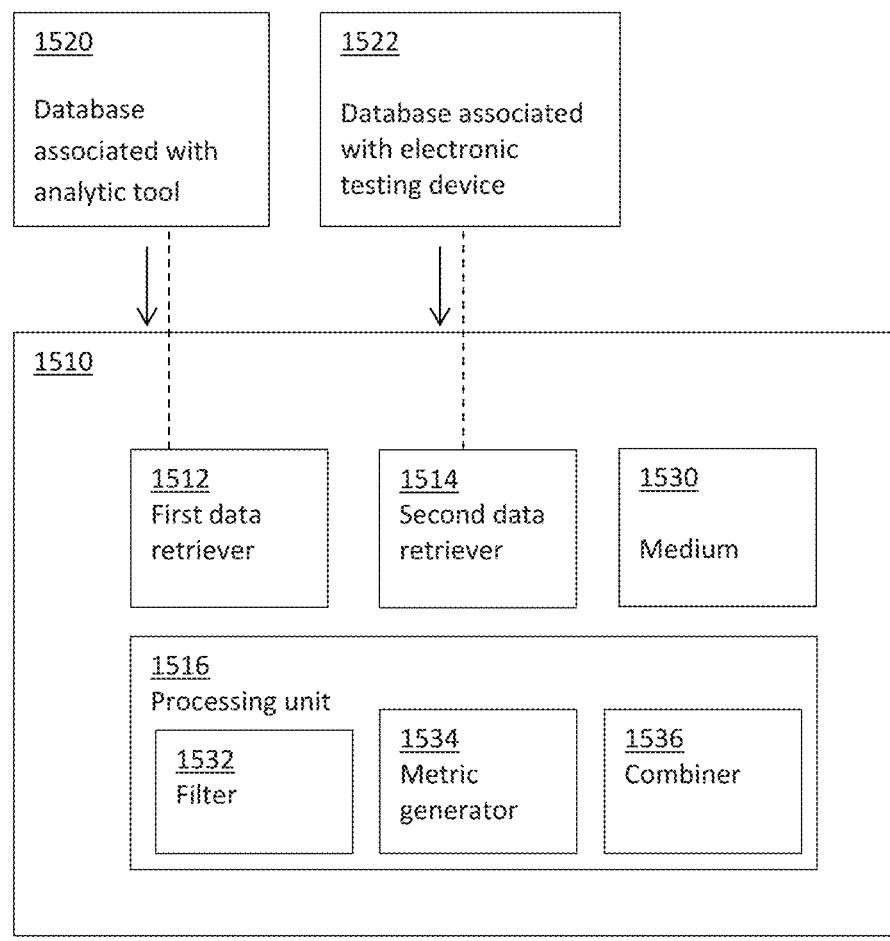
FIG. 11 illustrates an electronic system for evaluating product testing.

FIG. 11 illustrates an example of an electronic system 1510 configured for evaluating product testing performed for a product. The product may be any of the types of product disclosed herein. Also, the product testing may be any product testing performed using the system 10 described herein.

As shown in the figure, the electronic system 1510 includes a first data retriever 1512 configured to communicate with a first database 1520 associated with an analytic tool, and a second data retriever 1514 configured to communicate with a second database 1522 associated with an electronic testing device. The electronic testing device may be the system 10 or may be one or more components of the system 10 in some embodiments. The analytic tool is configured to generate and store information regarding actual usage of a product in the first database 1520. The electronic testing device is configured to generate and store product testing data for the product in the second database 1522. The first data retriever 1512 comprises a first communication interface configured to electronically receive the information regarding the actual usage of the product from the first database 1520. The second data retriever 1514 comprises a second communication interface configured to electronically receive the product testing data from the second database 1522.

In some embodiments, the first database 1520 comprises, or is associated with, an analytic tool configured to analyze actual usage of a product. For example, the analytic tool may be a web analytic tool (e.g., Google Analytics, Segment, MixPanel, Heap, etc.) configured to analyze usage of a website. In such cases, the information from the first database 1520 may indicate traffic distribution (e.g., numbers of user visits) for different pages of the website. Also, in some embodiments, the product testing data indicates aspects of the product that have been tested. In some embodiments, the product testing data may indicate numbers of product testing performed for different aspects of the product.

The electronic testing device to which the second database 1522 is associated with may be any device configured to perform product testing. In some embodiments, the electronic testing device may configured to provide a user interface for allowing multiple testers to perform product testing for the product to generate the product testing data. Alternatively, or additionally, the electronic testing device may also be configured to perform machine-based product testing without involvement of human tester. In one implementation, the electronic testing device may be the system 10 described herein, or any component(s) thereof.

As shown in the figure, the electronic system 1510 further includes a processing unit 1516 configured to compute a score indicating a degree of coverage achieved by the product testing for the product based on the information regarding the actual usage of the product and the product testing data. The electronic device 1510 further includes a non-transitory medium 1530 configured to store the score computed by the processing unit 1516. The processing unit 1516 includes a filter 1532, a metric generator 1534, and a combiner 1536.

The filter 1532 is configured to filter information received from the database 1520 via the first data retriever 1512, so that only relevant part of the information is passed downstream for processing. In some embodiments, the filter 1532 is configured to select a subset of the information received from the first database 1520 based on certain pre-determined rules. For example, if certain information from the first database 1520 is for a certain hidden webpage, then the filter 1532 may disregard such information. As another example, if information from the first database 1520 contains duplicate data, then the filter 1532 may filter out the duplicate data. In some embodiments, the filter 1532 may include an aggregator configured to combine different data in a meaningful way that represent a certain aspect of a product, so that the combined data can be later compared with testing data for the same aspect of the product. For example, if the product being tested is a website, the information received from the database 1520 may be data for one or more paths (e.g., a URL, a webpage, etc.) of the product, data for one or more events (e.g., an action such as a click on a button, a selection of an object, etc.), and/or data for one or more flow (e.g., a serious of events). In some cases, an event and a path for the website may be related. In such cases, the aggregator may combine data for the particular event with data for the particular path that is related to the event, so that the combined data can be later compared with testing data.

The metric generator 1534 is configured to generate metrics for respective aspects of the product. For example, if the product is a website having a number of webpages, each webpages may be considered an aspect of the product. Alternatively, if a webpage has different features, each of the features may be considered an aspect of the product. Each metric generated by the metric generator 1534 indicates a degree of testing coverage for a respective one of the aspects of the product. In some embodiments, if the product tested includes a webpage, the metric generator 1534 is configured to generate a metric based on a difference or a ratio between a number of user visits at a webpage and a number of tests performed for the webpage. In other embodiments, the metric generator 1534 is configured to generate a metric based on a difference or a ratio between a normalized number of user visits at a webpage and a normalized number of tests performed for the webpage.

The combiner 1536 is configured to combine the metrics to determine the score indicating a degree of coverage achieved by the product testing for the product. In some embodiments, the combiner 1536 is configured to apply respective weights for the metrics before combining the metrics to determine the score. Accordingly, in some embodiments, the score may be generated based on a plurality of weights. In some cases, the weights may correspond respectively with different parts of the product.

Example of Use

In one example of use, the electronic system 1510 may be configured to provide a score indicating a degree of product testing coverage performed to test a website. As users are using such website, a web analytic tool may collect information regarding the actual usage of the website. Such web analytic tool may also generate various analytic metrics that measures various aspects regarding the actual usage of the website. The collected information and the analytic metrics may be stored in the database (e.g., database 1520) that is associated with the web analytic tool.

Also, product testing may have been performed for the website. For example, product testers may have used the system 10 described herein to perform product testing on the website. In such cases, product testing data resulted from product testing are stored in the database 1522 associated with the testing device involved in the product testing. By means of non-limiting examples, the product testing data may indicate which aspects of the product have been tested, the number of testing performed for the respective aspects of the product, timing of the testing performed, etc. Following the above example in which the product is a website, the product testing data may include identifiers of aspects of the website that have been tested, and number of tests performed for the respective aspects.

During use of the electronic system 1510, the first data retriever 1512 obtains information regarding actual usage of the website from the first database 1520, and the second data retriever 1514 obtains product testing data from the second database 1522. In some embodiments, the information regarding actual usage of the website may indicate different paths (e.g., URL, webpage, etc.) reached by different users. The information regarding actual usage may also indicate number of users or "hits" for the different paths. In the illustrated example, assuming the website has 5 different paths (e.g., webpages), and assuming the information regarding actual usage contains the below number of hits for the 5 different paths:

Path 1:34 hits
Path 2: 13 hits
Path 3: 3 hits
Path 4: 55 hits
Path 5: 23 hits

Similarly, the product testing data obtained from the second database 1522 may indicate different paths tested by different testers to navigate to different areas in the website. The product testing data may also indicate number of testers or "hits" for the different paths during product testing. In the illustrated example, assuming the product testing were performed to test the 5 paths corresponding to 5 different respective areas in the website, and assuming that the below data are included in the product testing data:

Path 1: tested 12 times
Path 2: tested 58 times
Path 3: tested 40 times
Path 4: tested 0 times
Path 5: tested 3 times In one implementation, the metric generator 1534 may be configured to generate metrics for the respective paths. For example, the metric generator 1534 may determine a metric for a path by dividing the actual number of hits during usage by a total number of hits for all paths. Following the above example, the total number of "hits" from actual usage of the website is 34+13+3+55+23=128 hits. For each path, a weight (or normalized usage data) may be calculated as number of hits for that path divided by 128 hits:

| | |
|---|---|
| Path 1: 34 hits | Weight (normalized usage data) = 0.27 |
| Path 2: 13 hits | Weight (normalized usage data) = 0.10 |
| Path 3: 3 hits | Weight (normalized usage data) = 0.02 |
| Path 4: 55 hits | Weight (normalized usage data) = 0.43 |
| Path 5: 23 hits | Weight (normalized usage data) = 0.18 |

Total: 128 hits

Each weight (normalized usage data) may be considered as a metric for the corresponding path. Also, in some cases, each path may be considered as a feature of a product. In such cases, the weight (normalized usage data) may be considered as a metric for the corresponding feature of the product.

In some embodiments, the combiner 1536 is configured to determine a score of the product testing indicating a degree of product testing coverage while considering the product testing data. Following the above example, because the product testing data indicates that the path 4 was tested zero times, the combiner 1536 may exclude the metric (i.e., with metric value of "0.43" in the example) calculated for path 4, and will combine only the metrics for paths 1, 2, 3, and 5. Accordingly, the combiner 1536 may determine the score as 0.27+0.1+0.02+0.18=0.57 (or 57 in a scale of 1-100). The score indicates a degree of product testing coverage. As shown in the example, the score is 43 short of a perfect score of 100 because path 4 has a normalized value of 0.43 (indicating that path 4 was used 43% of the time), but path 4 has not been tested at all. Accordingly, the above technique for calculating the score of product testing has the benefit of indicating whether the product testing has tested all of the features of the product.

In the above embodiments, the score of product testing is a quality score indicates how thorough the different features of a product have been tested (i.e., a degree of coverage achieved by the product testing). In other embodiments, the score of product testing may be a quality score indicating how well the distribution of testing of the various features corresponds with the distribution of usage of the product. Following the above example, each testing data may be normalized, as follow:

| | |
|---|---|
| Path 1: tested 12 times | normalized test data = 0.11 |
| Path 2: tested 58 times | normalized test data = 0.51 |
| Path 3: tested 40 times | normalized test data = 0.35 |
| Path 4: tested 0 times | normalized test data = 0.00 |
| Path 5: tested 3 times | normalized test data = 0.03 |

Total: tested 113 times

In such cases, the metric generator 1534 may be configured to generate a ratio for the corresponding path as normalized test data divided by normalized usage data, as follow:

Path 1: ratio=0.11/0.27=0.39
Path 2: ratio=0.51/0.1=5.13
Path 3: ratio=0.35/0.02=17.7
Path 4: ratio=0.00/0.43=0
Path 5: ratio=0.03/0.18=0.15

If any of the above ratios is greater than 1, that means the amount of testing relative to the total amount of testing is more than the amount of usage relative to the total amount of usage. For example, for path 2, the ratio is 5.13 which is greater than 1. This is the case because 51% of the product testing "hits" is for path 2, while in the actual usage of the product, only 10% of the hits are for path 2. Accordingly, in some embodiments, if the ratio is greater than 1, that means the corresponding path has already been thoroughly tested, and the ratio may be adjusted to be 1.0 for the purpose of score calculation. Following the above example, the ratios for paths 2 and 3 are adjusted to be 1.0, and ratios for the 5 paths become:

Path 1: ratio=0.39
Path 2: ratio=1.0
Path 3: ratio=1.0
Path 4: ratio=0
Path 5: ratio=0.15

Next, the above ratios may be multiplied by respective weights (normalized usage data) to obtain respective contributions for the score, as follow:

Path 1: ratio×weight=0.39×0.27=0.11
Path 2: ratio×weight=1.0×0.10=0.1
Path 3: ratio×weight=1.0×0.02=0.02
Path 4: ratio×weight=0× 0.43=0
Path 5: ratio×weight=0.15×0.18=0.03

The combiner 1536 may then calculate the score as 0.11+0.1+0.02+0+0.03=0.26 (or 26 in a scale of 1-100).

It should be noted that the same score may be obtained by examining the normalized usage data and the normalized test data, which are summarized below:

| Path | Normalized usage data | Normalized test data |
|---|---|---|
| 1 | 0.27 | 0.11 |
| 2 | 0.10 | 0.51 |
| 3 | 0.02 | 0.35 |
| 4 | 0.43 | 0.00 |
| 5 | 0.18 | 0.03 |

In one implementation, the metric generator 1534 and/or the combiner 1536 may be configured to select one of the normalized usage data and the normalized test data that has a lower value for each path, and use the selected value as the contribution of the score for that path. Following the above example, the respective contributions of the score for the 5 paths are determined as:

Path 1: Min (0.27, 0.11)=0.11
Path 2: Min (0.10, 0.51)=0.10
Path 3: Min (0.02, 0.35)=0.02
Path 4: Min (0.43, 0.00)=0.00
Path 5: Min (0.18, 0.03)=0.03

The combiner 1536 may then determine the score as 0.11+0.1+0.02+0+0.03=0.26 (or 26 in a scale of 1-100). The above technique results in the same score because if a normalized testing is less than a normalized usage, then the value of the normalized testing will contribute to the total score. On the other hand, if the normalized testing is more than a normalized usage for a particular path, that means the testing for that path is adequate, and the contribution of the score for that path is capped at the maximum contribution by the actual usage. This means that if the normalized testing is more than the normalized usage, then the normalized usage value is used as the contribution for the score.

In some embodiments, the normalized test data for the respective paths may be considered as examples of metrics for the respective features of a product. In other embodiments, the ratios calculated as normalized test data divided by normalized usage data for the respective paths may be considered as examples of metrics for the respective features of a product. In further embodiments, any ratio that has been adjusted may also be considered to be a metric. In other embodiments, the normalized usage data for the respective paths may be considered as examples of metrics for the respective features of a product.

In the above example, the score is illustrated as being generated from contribution values for different paths (e.g., URL, webpage) of a website product. In other embodiments, the score may be generated from contribution values for different events (e.g., an action such as clicking of a button, a selection of an object, etc.) performed in one or more pages of a product. In further embodiments, the score may be generated from contribution values for different flows (e.g., a combination of events) for a product. In other embodiments, the score may be generated from contribution values from one or more paths, one or more events, one or more flows, or any combination of the foregoing, for a product.

Although the above example is described with reference to the product being a website, in other embodiments, the product may be different from a website. Also, it should be noted that the above techniques for calculating the score indicating a degree of product testing coverage are merely examples, and that other techniques may be used in other embodiments. Accordingly, the systems and methods described herein should not be limited to the examples of techniques described.

In some embodiments, the processing unit 1516 may be configured to determine an additional score(s) for the product testing of the product. In such cases, the score and the additional score(s) are for respective different times, and the electronic system 1510 may further include a database structure configured to store the score and the additional score in association with the respective times. The score and the additional score may be collectively utilized to indicate how the quality of the product testing changes over time for the product. In some embodiments, the processing unit 1516 may generate a graphic indicating a variation of the score over time, so that a user may see how the quality of product testing changes over time. An example of such graphic may be a chart, like the chart 1570 in FIG. 12, which will be described below.

In some embodiments, the processing unit 1516 may also be configured to generate a recommendation for a new product testing based on the score. For example, if the score indicates that a testing coverage is not sufficient for a product, the processing unit 1516 may then determine the contributing factors for the low score. The processing unit 1516 may examine the metrics that were used to calculate the score, and may identify one or more of the metrics that have relatively low values. In such cases, the processing unit 1516 may generate a recommendation that additional product testing be performed to test an aspect of the product for which the metric has a relatively low value. In one implementation for the situation in which the product includes a webpage, a metric with a low value (e.g., compared to other metric values) may indicate that there has been insufficient product testing to test that webpage, or a feature associated with that webpage. In such situation, the processing unit 1516 may generate a recommendation that additional testing be performed to test that webpage or a feature associated with the webpage.

In some embodiments, the processing unit 1510 may also be configured to automatically provision one or more new product tests to test the product based on the score. For example, the processing unit 1510 may generate product testing request(s) for transmission to one or more testers to test certain feature of the product. Alternatively, the processing unit 1510 may communicate with the system 10 to cause the system 10 to generate the product testing request (s), as similarly described with reference to the system 10. Alternatively or additionally, the processing unit 1510 may generates control signals to cause one or more product testing be performed using machine-based testing without involvement of a human tester. In machine-based product testing the system 10 simulate actions of a human tester to perform one or more tasks to test the product. For example, the system 10 may test a website by performing certain tasks in the website, such as selecting a tab, clicking a button, opening a menu, typing a text in a field, etc.

Also, in some embodiments, the processing unit 1510 may be configured to generate, or to send request for generation of, additional product testing to cover certain aspect of the product that has been under-tested. For example, if information from the first database 1520 indicates that 80% of users of a website goes to webpage X, while the product testing data from the second database 1522 indicates that only 40% of the testing has been done on webpage X, then the processing unit 1510 may generate additional product testing to test the webpage X. As another example, the information from the first database 1520 may indicate that 90% of users performed certain tasks on Chrome, but the testing data from the second database 1522 may indicate that the testing was done on Firefox. In such cases, the processing unit 1510 may generate additional product testing to test the feature using Chrome.

In the illustrated embodiments, the non-transitory medium 1530 has a database structure that is configured to store the score in association with the product testing data. In some cases, the database structure may also be configured to store the metric in association with the information regarding the actual usage of the product.

In some embodiments, the electronic system 1510 may further include a graphic generator configured to generate a graphic indicating the score computed by the processing unit 1516. The graphic generator may be implemented as a part of the processing unit 1516, or as a separate component that is communicatively coupled to the processing unit 1516.

Also, in some embodiments, the processing unit 1516 may be configured to provide the score for display on a hand-held device, and/or for display on a computer screen or a laptop screen. For example, in some embodiments, the processing unit 1516 may pass the score to a data communication unit (e.g., a transceiver, a electronic connector, etc.) that is configured to transmit data. The data communication unit transmits the score wirelessly or through a cable to a hand-held device, computer, or laptop, for display of the score.

The above embodiments have been described with reference to testing a website or a webpage as an example. In other embodiments, the product may be other types of product, such as a computer application, a mobile device application, a processor application, etc.

It should be noted that the electronic system 1510 is not limited to the example described, and that the electronic system 1510 may have other configurations in other embodiments. For example, in other embodiments, the electronic system 1510 may not include all of the components 1512, 1514, 1530, 1532, 1534, 1536. In other embodiments, the medium 1530 may be implemented outside the electronic system 1510, and may be one or more storage devices (e.g., server(s), database(s), hard drive(s), etc.). Also, in other embodiments, one or more of the components of the electronic system 1510 may be combined. For example, in other embodiments, the metric generator 1534 and the combiner 1536 may be integrated into a single module. Similarly, in other embodiments, the first data retriever 1512 and the second data retriever 1514 may be combined, or may be implemented using one or more communication interface(s). In one implementation, the same communication component may be used to implement both the first and second data retriever 1512, 1514.

Figure 12:
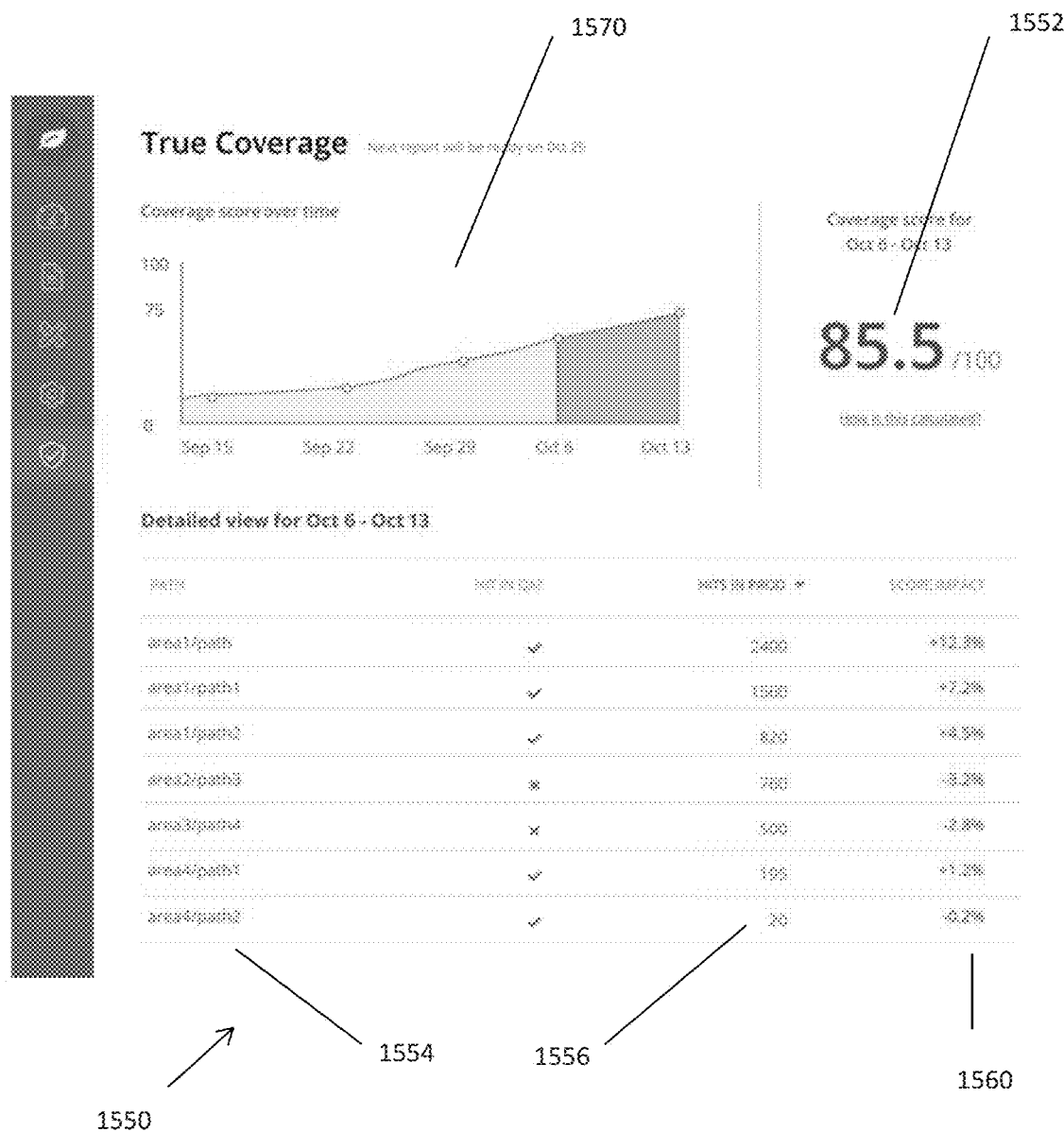
FIG. 12 illustrates an output of the electronic system of FIG. 11.

FIG. 12 illustrates an example of an output 1550 of the electronic system of FIG. 11. As shown in the figure, the output 1550 includes the overall score 1552 for the product. In the illustrated example, the highest achievable score is 100. In other embodiments, the highest achievable score may have other values, such as 10, 1.0, etc. Also, as shown in the figure, the output 1550 also indicates the relevant period "October 6-October 13" for the score "85.5". The relevant period may correspond with a period or a frequency of product release. For example, if a website product is released with a new version every 2 weeks, then the relevant period may be 2 weeks or less (e.g., 2 days, 4 days, 1 week, etc.) since the last release date of the product. In some embodiments, the electronic system 1510 may provide a user interface that allows a user to select which period to view the overall score 1552. Depending on which period the user selects, the score 1552 may have a different value. This is because the number of usage of the product in different periods may be different. Also, the number of "hits" resulted from product testing may also be different in different periods.

In some embodiments, the score 1552 has a value that indicates a degree of product testing coverage. A higher value for the score 1552 indicates that the coverage by product testing is higher compared to a lower value for the score 1552. In some embodiments, if a particular aspect (e.g., area, path, etc. of a website) of a product has been tested, then the value of the actual usage of that aspect will be used by the processing unit 1516 to determine a metric representing a positive contribution to the overall score 1552. On the other hand, if a particular aspect of a product has not been tested, then the processing unit 1516 may determine a metric value of zero (0) representing no contribution to the overall score 1552.

In some embodiments, the score 1552 generated by the processing unit 1516 indicates how well actual usage corresponds with testing coverage. If a feature of a product is used by a lot of people, then that feature should be tested more. If the actual usage does not correspond with testing coverage, then the score 1552 would be lower, and vice versa.

As shown in the figure, the output 1550 also includes identifiers 1554 of different aspects of a product. In the illustrated example, the product is a website, and the different aspects are different paths (e.g., webpages) in the website. The output 1550 also indicates number of "hits" 1556 by users of the product who reached different areas in the website. As shown in the figure, there are 1560 hits by users who reached "path1" of the product, 820 hits by users who reached "path2" of the product, etc.

The output 1550 also includes score impact values 1560 for the respective paths. In some embodiments, the score impact values 1560 may be the respective contributions for the different paths. Using the above examples, the score impact values 1560 may 0.11 for Path 1, 0.1 for Path 2, 0.02 for Path 3, 0 for Path 4, and 0.03 for Path 5. In other embodiments, the score impact values 1560 may be respective contributions for different events (e.g., a click on a button, a selection of an object, etc.), or respective contributions for different flows (wherein each flow may be a combination of events).

In further embodiments, each score impact value 1560 may indicate whether the metric for the corresponding path has a positive or a negative impact to the overall score 1552 for the product. In some embodiments, if the number of testing corresponds with the number of usage for a particular aspect of a website product, then the metric for that aspect will contribute positively to the overall score 1552, and vice versa. For example, if 60% of users hits path1 during actual usage of the product, but if only 10% of testing were performed for path1, then the metric for path1 would contribute negatively to the overall score 1552. On the other hand, if 55% of the testing were performed for path 1, then the metric for path 1 would contribute positively to the overall score 1552. In one implementation, the average contribution for the different paths/events/flows may be calculated. Then the score impact values for the respective paths/events/flows may be calculated as the difference between each contribution and the calculated average. Following the above example, the average contribution for the different paths is $(0.11+0.1+0.02+0+0.03)/5=0.052$. The score impact values for the 5 paths may then be calculated as:

Path 1: $0.11-0.052=0.058$
Path 2: $0.1-0.052=0.048$
Path 3: $0.02-0.052=-0.032$
Path 4: $0-0.052=-0.052$
Path 5: $0.03-0.052=-0.022$ In the above example, a negative score impact value indicates that the score for the respective path has a negative impact on the overall score, and a positive score impact value indicates that the score for the respective path has a positive impact on the overall score. In other embodiments, the system may calculate the score impact values using other techniques.

In some embodiments, the output 1550 may also optionally indicates respective weights for the different paths leading to different areas in the website. In one implementation, each weight is calculated by the processing unit 1516 by dividing number of hits for the particular path with a total number of hits across all paths. In some cases, each weight may be considered as an example of a metric indicating a degree of usage for a particular path. In other embodiments, each weight may be used to compute a metric indicating a degree of usage for a particular path.

In the illustrated embodiments, the output 1550 also includes a chart 1570 showing how the score 1552 varies over time. This allows a user to see if product testing have been performed to have a positive impact on the score or not.

Figure 13:
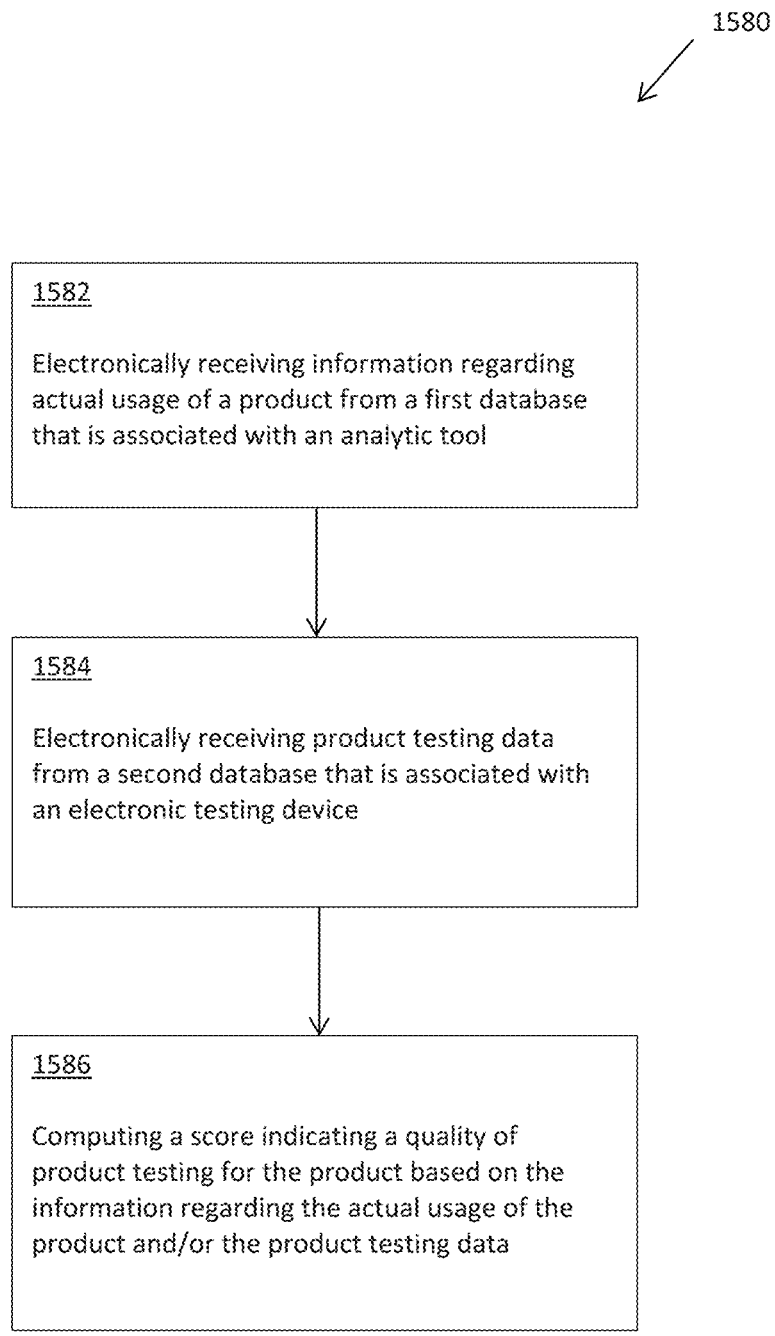
FIG. 13 illustrates a method performed by the electronic system of FIG. 11.

FIG. 13 illustrates a method 1580 performed by the electronic system 1510 of FIG. 11. The method 1580 includes electronically receiving information regarding actual usage of a product from a first database that is associated with an analytic tool (item 1582). The method 1580 also includes electronically receiving product testing data from a second database that is associated with an electronic testing device (item 1584). The method 1580 further includes computing a score indicating a quality of product testing for the product based on the information regarding the actual usage of the product and/or the product testing data (item 1586).

By means of non-limiting examples, the product in the method 1580 may comprise a web page, a web site, a computer application, a mobile device application, or a processor application.

In the method 1580, the electronic testing device may be any device that is used for, or that is involved in, product testing. In some embodiments, the electronic testing device may be configured to provide a user interface for allowing multiple testers to perform product testing for the product to generate the product testing data. In one implementation, the electronic testing device may be the system 10, or one or more components of the system 10.

Optionally, in the method 1580, the analytic tool comprises a web analytic tool.

Optionally, in the method 1580, the analytic tool comprises Google Analytics, Segment, MixPanel, or Heap.

Optionally, in the method 1580, the product comprises a website, and wherein the information from the data source indicates traffic distribution for different pages of the website.

Optionally, the method 1580 further includes normalizing, by a normalizer, the information regarding actual usage of the product.

Optionally, in the method 1580, the score is computed based on a plurality of weights. For example, the weights may correspond respectively with different parts of the product, such as different webpages of a website.

Optionally, the method 1580 includes generating, by a metric generator, metrics for respective aspects of the product.

Optionally, the method 1580 includes combining, by a combiner, the metrics to determine the score.

Optionally, the method 1580 includes applying, by the combiner, respective weights for the metrics before combining the metrics to determine the score.

Optionally, in the method 1580, one of the aspects of the product comprises a webpage of a website.

Optionally, in the method 1580, one of the metrics indicates a degree of testing coverage for a respective one of the aspects of the product.

Optionally, in the method 1580, one of the metrics is generated by the metric generator based on a difference or a ratio between a number of user visits at a webpage and a number of tests performed for the webpage.

Optionally, in the method 1580, one of the metrics is generated by the metric generator based on a difference or a ratio between a normalized number of user visits at a webpage and a normalized number of tests performed for the webpage.

Optionally, the method 1580 further includes determining, by a processing unit, an additional score, wherein the score and the additional score are for respective different times. The score and the additional score may be stored using a database structure of an electronic system that associates the score and the additional score with the respective times. In some cases, the score and the additional score may indicate how the quality of the product testing changes over time for the product.

Optionally, the method 1580 further includes generating, by a processing unit, a recommendation for a new product testing based on the score.

Optionally, the method 1580 further includes automatically provisioning, by a processing unit, one or more new product tests to test the product based on the score.

Optionally, in the method 1580, the product testing data indicates aspects of the product that have been tested.

Optionally, in the method 1580, the product testing data indicates numbers of product testing performed for respective aspects of the product.

Optionally, the method 1580 further includes storing the score in association with the product testing data in a non-transitory medium of an electronic system, wherein the non-transitory medium has a database structure that is configured to store the score in association with the product testing data.

Optionally, the method 1580 also includes storing the score in association with the information regarding the actual usage of the product, wherein the database structure is also configured to store the score in association with the information regarding the actual usage of the product.

Optionally, in the method 1580, the score indicates a degree of coverage achieved by the product testing.

Optionally, in the method 1580, the score indicates how well a distribution of the product testing of various features of the product corresponds with a distribution of the actual usage of the product.

Optionally, the method 1580 comprises normalizing the information regarding the actual usage of the product, and/or normalizing the product testing data.

Optionally, in the method 1580, the score is based at least in part on the normalized information regarding the actual usage of the product, and/or the normalized product testing data.

Optionally, the method 1580 further includes generating, by a graphic generator, a graphic indicating the score. The graphic may be output for display on a screen for presentation to a user.

Optionally, the method 1580 further includes providing, by a processing unit, the score for display on a hand-held device.

Optionally, the method 1580 further includes providing, by a processing unit, the score for display on a computer screen or a laptop screen.

Specialized Processing System

Figure 14:
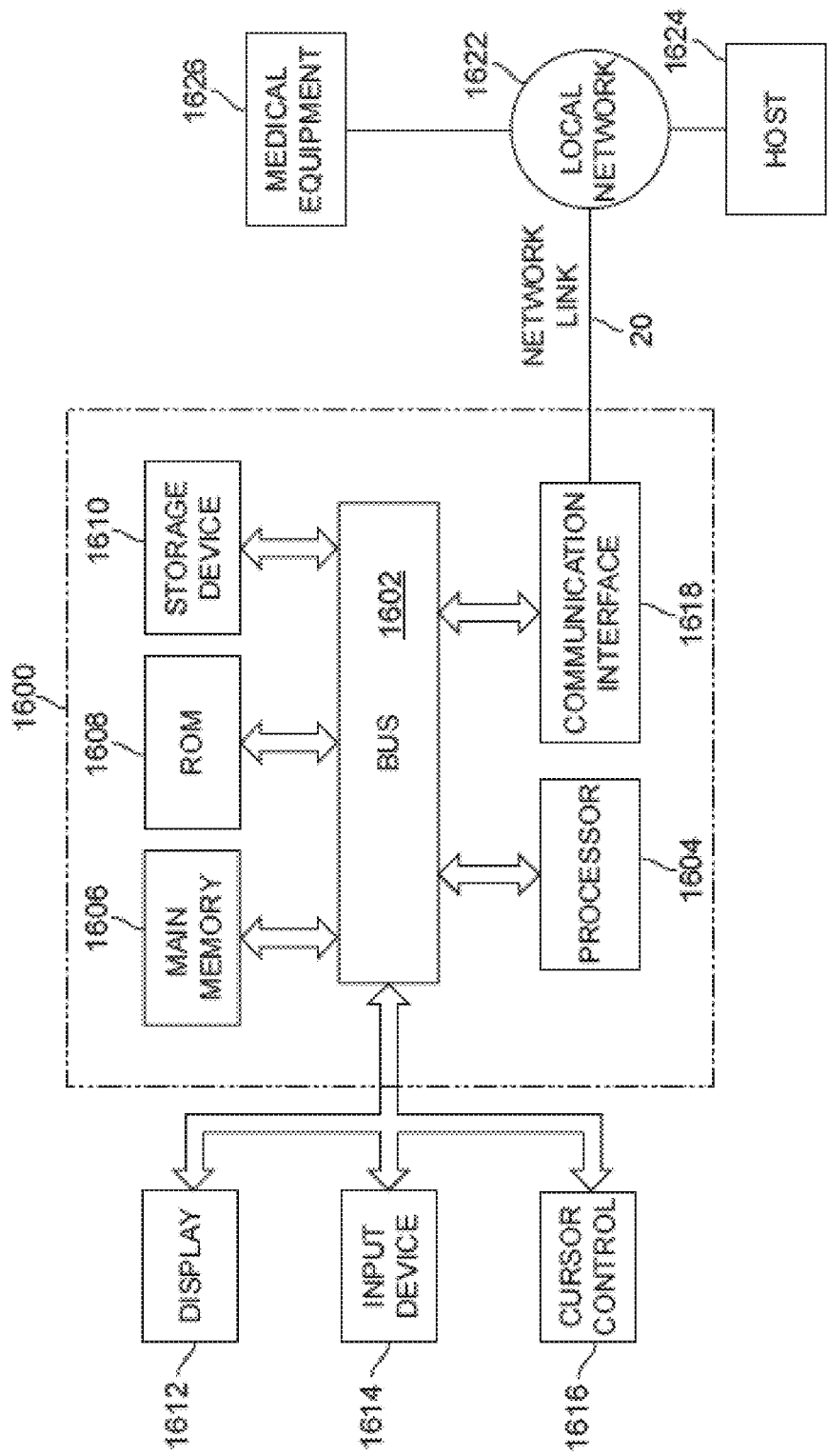
FIG. 14 is a block diagram of a specialized processing system.

FIG. 14 is a block diagram illustrating an embodiment of a specialized processing system 1600 that can be used to implement various embodiments or features described herein. For example, the processing system 1600 may be used to implement the system 10 of FIG. 1A and FIG. 1B, or any component thereof. As another example, the processing system 1600 may be an example of a device being used by a product tester. Additionally, or alternatively, the specialized processing system 1600 may implement the processing unit 1510 of FIG. 11, or any component thereof.

Processing system 1600 includes a bus 1602 or other communication mechanism for communicating information, and a processor 1604 coupled with the bus 1602 for processing information. The processor system 1600 also includes a main memory 1606, such as a random access memory (RAM) or other dynamic storage device, coupled to the bus 1602 for storing information and instructions to be executed by the processor 1604. The main memory 1606 also may be used for storing temporary variables or other intermediate information during execution of instructions to be executed by the processor 1604. The processor system 1600 further includes a read only memory (ROM) 1608 or other static storage device coupled to the bus 1602 for storing static information and instructions for the processor 1604. A data storage device 1610, such as a magnetic disk or optical disk, is provided and coupled to the bus 1602 for storing information and instructions.

The processor system 1600 may be coupled via the bus 1602 to a display 167, such as a cathode ray tube (CRT), for displaying information to a user. An input device 1614, including alphanumeric and other keys, is coupled to the bus 1602 for communicating information and command selections to processor 1604. Another type of user input device is cursor control 1616, such as a mouse, a trackball, or cursor direction keys for communicating direction information and command selections to processor 1604 and for controlling cursor movement on display 167. This input device typically has two degrees of freedom in two axes, a first axis (e.g., x) and a second axis (e.g., y), that allows the device to specify positions in a plane.

In some embodiments, the processor system 1600 can be used to perform various functions described herein. According to some embodiments, such use is provided by processor system 1600 in response to processor 1604 executing one or more sequences of one or more instructions contained in the main memory 1606. Those skilled in the art will know how to prepare such instructions based on the functions and methods described herein. Such instructions may be read into the main memory 1606 from another processor-readable medium, such as storage device 1610. Execution of the sequences of instructions contained in the main memory 1606 causes the processor 1604 to perform the process steps described herein. One or more processors in a multi-processing arrangement may also be employed to execute the sequences of instructions contained in the main memory 1606. In alternative embodiments, hard-wired circuitry may be used in place of or in combination with software instructions to implement the various embodiments described herein. Thus, embodiments are not limited to any specific combination of hardware circuitry and software.

The term "processor-readable medium" as used herein refers to any medium that participates in providing instructions to the processor 1604 for execution. Such a medium may take many forms, including but not limited to, non-volatile media, volatile media, and transmission media. Non-volatile media includes, for example, optical or magnetic disks, such as the storage device 1610. A non-volatile medium may be considered an example of non-transitory medium. Volatile media includes dynamic memory, such as the main memory 1606. A volatile medium may be considered an example of non-transitory medium. Transmission media includes coaxial cables, copper wire and fiber optics, including the wires that comprise the bus 1602. Transmission media can also take the form of acoustic or light waves, such as those generated during radio wave and infrared data communications.

Common forms of processor-readable media include, for example, a floppy disk, a flexible disk, hard disk, magnetic tape, or any other magnetic medium, a CD-ROM, any other optical medium, punch cards, paper tape, any other physical medium with patterns of holes, a RAM, a PROM, and EPROM, a FLASH-EPROM, any other memory chip or cartridge, a carrier wave as described hereinafter, or any other medium from which a processor can read.

Various forms of processor-readable media may be involved in carrying one or more sequences of one or more instructions to the processor 1604 for execution. For example, the instructions may initially be carried on a magnetic disk of a remote computer. The remote computer can load the instructions into its dynamic memory and send the instructions over a telephone line using a modem. A modem local to the processing system 1600 can receive the data on the telephone line and use an infrared transmitter to convert the data to an infrared signal. An infrared detector coupled to the bus 1602 can receive the data carried in the infrared signal and place the data on the bus 1602. The bus 1602 carries the data to the main memory 1606, from which the processor 1604 retrieves and executes the instructions. The instructions received by the main memory 1606 may optionally be stored on the storage device 1610 either before or after execution by the processor 1604.

The processing system 1600 also includes a communication interface 1618 coupled to the bus 1602. The communication interface 1618 provides a two-way data communication coupling to a network link 1620 that is connected to a local network 1622. For example, the communication interface 1618 may be an integrated services digital network (ISDN) card or a modem to provide a data communication connection to a corresponding type of telephone line. As another example, the communication interface 1618 may be a local area network (LAN) card to provide a data communication connection to a compatible LAN. Wireless links may also be implemented. In any such implementation, the communication interface 1618 sends and receives electrical, electromagnetic or optical signals that carry data streams representing various types of information.

The network link 1620 typically provides data communication through one or more networks to other devices. For example, the network link 1620 may provide a connection through local network 1622 to a host computer 1624 or to equipment 1626 such as a radiation beam source or a switch operatively coupled to a radiation beam source. The data streams transported over the network link 1620 can comprise electrical, electromagnetic or optical signals. The signals through the various networks and the signals on the network link 1620 and through the communication interface 1618, which carry data to and from the processing system 1600, are exemplary forms of carrier waves transporting the information. The processing system 1600 can send messages and receive data, including program code, through the network(s), the network link 1620, and the communication interface 1618.

It should be noted that as used in this specification, the term "image" is not limited to an image that is displayed, and may also include image that is not displayed, such as image data stored in a non-transitory medium. Similarly, as used in this specification, the term "video" is not limited to a video that is displayed, and may also include video that is not displayed, such as video data stored in a non-transitory medium.

In addition, as used in this specification, the term "device" may refer to one or more physical item(s) (such as hardware), software, or a combination of both physical item(s) and software. The term "device" may also refer to an apparatus implemented using hardware, software, or a combination of both.

Also, as used in this specification, the terms "first", "second", "third", etc., do not necessarily refer to order of items. Rather, these terms may be used to distinguish different items from each other. For example, "first product tester" does not necessarily mean that the product tester is the first in order. Also, "second product tester" does not necessarily mean that the product tester is the second in order. Rather, these terms are used to identify two different product testers.

Although particular embodiments have been shown and described, it will be understood that they are not intended to limit the present inventions, and it will be obvious to those skilled in the art that various changes and modifications may be made without departing from the spirit and scope of the present inventions. The specification and drawings are, accordingly, to be regarded in an illustrative rather than restrictive sense. The present inventions are intended to cover alternatives, modifications, and equivalents, which may be included within the spirit and scope of the present inventions as defined by the claims.

What is claimed:

1. An electronic system comprising a first data retriever configured to communicate with a first database associated with an analytic tool, and a second data retriever configured to communicate with a second database associated with an electronic testing device;
   wherein the analytic tool is configured to generate and store information regarding actual usage of a product in the first database;
   wherein the electronic testing device is configured to generate and store product testing data for the product in the second database;
   wherein the first data retriever comprises a first communication interface configured to electronically receive the information regarding the actual usage of the product from the first database;
   wherein the second data retriever comprises a second communication interface configured to electronically receive the product testing data from the second database, the second database being different from the first database; and
   wherein the electronic system further comprises a processing unit configured to compute a score indicating a quality of product testing for the product based on the information regarding the actual usage of the product and/or the product testing data, wherein the product testing comprises respective amounts of workability testings performed respectively for different features of the product, and wherein the score is based on how well the respective amounts of the workability testings performed respectively for the different features of the product correspond with the actual usage associated with the features of the product; and
   wherein the processing unit comprises a metric generator configured to generate metrics respectively for the different features of the product, the metrics related to the respective amounts of workability testings performed respectively for the different features of the product, and wherein the processing unit is configured to compute the score based on the metrics relating to the respective amounts of workability testings performed respectively for the different features of the product.

2. The electronic system of claim 1, wherein the analytic tool comprises a web analytic tool.

3. The electronic system of claim 1, wherein the product comprises a website, and wherein the information from the first database indicates traffic distribution for different parts of the website.

4. The electronic system of claim 1, wherein the processing unit comprises a normalizer configured to normalize the information regarding the actual usage of the product.

5. The electronic system of claim 1, wherein the processing unit is configured to compute the score based on a plurality of weights that correspond respectively with the different features of the product.

6. The electronic system of claim 1, wherein at least one of the metrics indicates whether a corresponding one of the features of the product is working properly or not.

7. The electronic system of claim 1, wherein the processing unit also comprises a combiner configured to combine the metrics to determine the score.

8. The electronic system of claim 7, wherein the combiner is configured to apply respective weights for the metrics before combining the metrics to determine the score.

9. The electronic system of claim 1, wherein one of the features of the product comprises a webpage of a website, or a component in the webpage of the website.

10. The electronic system of claim 1, wherein one of the metrics indicates a degree of testing coverage for a respective one of the features of the product.

11. The electronic system of claim 1, wherein one of the metrics is based on a difference or a ratio between a number of user visits at a webpage and a number of tests performed for the webpage, wherein the tests are for determining whether one or more of the features of the product is working or not.

12. The electronic system of claim 1, wherein one of the metrics is based on a difference or a ratio between a normalized number of user visits at a webpage and a normalized number of tests performed for the webpage, wherein the tests are for determining whether one or more of the features of the product is working or not.

13. The electronic system of claim 1, wherein the processing unit is configured to determine an additional score, wherein the score and the additional score are for respective different times, and wherein the electronic system further comprises a database structure configured to store the score and the additional score in association with the respective times.

14. The electronic system of claim 13, wherein the score and the additional score indicates how the quality of the product testing changes over time for the product.

15. The electronic system of claim 1, wherein the processing unit is also configured to generate a recommendation for a new product testing based on the score.

16. The electronic system of claim 1, wherein the processing unit is also configured to automatically provision one or more new product tests to test the product based on the score.

17. The electronic system of claim 1, wherein the electronic testing device is configured to provide a user interface for allowing multiple testers to perform product testing for the product to generate the product testing data.

18. The electronic system of claim 1, further comprising a non-transitory medium having a database structure that is configured to store the score in association with the product testing data.

19. The electronic system of claim 18, wherein the database structure is also configured to store the score in association with the information regarding the actual usage of the product.

20. The electronic system of claim 1, wherein the score indicates a degree of coverage achieved by the product testing.

21. The electronic system of claim 1, wherein the processing unit comprises one or more normalizers configured to normalize the information regarding the actual usage of the product, and/or to normalize the product testing data.

22. The electronic system of claim 21, wherein the score is based at least in part on the normalized information regarding the actual usage of the product, and/or the normalized product testing data.

23. The electronic system of claim 1, further comprising a graphic generator configured to generate a graphic indicating the score.

24. The electronic system of claim 1, wherein the product comprises a web page, a web site, a computer application, a mobile device application, or a processor application.

25. The electronic system of claim 1, wherein the processing unit is configured to provide the score for display on a hand-held device.

26. The electronic system of claim 1, wherein the processing unit is configured to provide the score for display on a computer screen or a laptop screen.

27. The electronic system of claim 1, wherein the analytic tool is associated with a first entity providing the analytic tool, and wherein the electronic testing device is associated with a second entity that is different from the first entity.

28. The electronic system of claim 27, wherein the first data retriever and the second data retriever are associated with the second entity, not the first entity.

29. The electronic system of claim 1, wherein the electronic testing device is configured to provide a first instruction instructing a human tester to test a first feature of the product.

30. The electronic system of claim 29, wherein the electronic testing device is configured to provide a second instruction instructing the human tester to test a second feature of the product, the second feature being different from the first feature.

31. The electronic system of claim 1, wherein the product comprises a website, and wherein the features of the product comprise different parts of the website or different paths of the website.

32. The electronic system of claim 1, wherein one of the features of the product comprises a single functional feature of the product, and wherein at least two of the workability testings are for testing the single functional feature of the product.

33. The electronic system of claim 1, wherein the processing unit is implemented using one or more processors.

34. The electronic system of claim 1, wherein the processing unit is configured to provide the score for display by a screen, and wherein the processing unit is also configured to provide one or more of the metrices for display by the screen.

35. The electronic system of claim 1, wherein the processing unit is configured to provide the score as an overall score for the product, and wherein the processing unit is also configured to provide indications indicating how the workability testings for the different respective features of the product affects the overall score for the product.

* * * * *